US012673368B2

(12) United States Patent
Walrand et al.

(10) Patent No.: US 12,673,368 B2
(45) Date of Patent: Jul. 7, 2026

(54) ADAPTIVE PATH FOR ADDITIVE MANUFACTURING USING A LASER SOURCE

(71) Applicants: AddUp, Cebazat (FR); Centre National De La Recherche Scientifique (CNRS), Paris (FR); Ecole Normale Superieure Paris-Saclay, Gif-Sur-Yvette (FR)

(72) Inventors: Gilles Walrand, Cebazat (FR); Christophe Tournier, Antony (FR); Sylvain Lavernhe, Saclay Val D'Albian (FR); Kamel Ettaieb, Cachan (FR)

(73) Assignees: ADDUP, Cebazat (FR); CENTRE NATIONAL DE LA RECHERCHE SCIENTIFIQUE (CNRS), Paris (FR); ECOLE NORMALE SUPERIEURE PARIS-SACLAY, Gif-sur-Yvette (FR)

( * ) Notice: Subject to any disclaimer, the term of this patent is extended or adjusted under 35 U.S.C. 154(b) by 904 days.

(21) Appl. No.: 17/763,800

(22) PCT Filed: Sep. 24, 2020

(86) PCT No.: PCT/FR2020/051665
§ 371 (c)(1),
(2) Date: Mar. 25, 2022

(87) PCT Pub. No.: WO2021/058913
PCT Pub. Date: Apr. 1, 2021

(65) Prior Publication Data
US 2022/0331871 A1 Oct. 20, 2022

(30) Foreign Application Priority Data
Sep. 27, 2019 (FR) ...................................... 1910742

(51) Int. Cl.
*B22F 10/366* (2021.01)
*B22F 10/28* (2021.01)
(Continued)

(52) U.S. Cl.
CPC ............ *B22F 10/366* (2021.01); *B22F 10/28* (2021.01); *B22F 10/85* (2021.01); *B22F 12/49* (2021.01);
(Continued)

(58) Field of Classification Search
None
See application file for complete search history.

(56) References Cited

U.S. PATENT DOCUMENTS

| | | |
|---|---|---|
| 8,825,366 B2 | 9/2014 | Giovannini |
| 9,073,265 B2 | 7/2015 | Snis |

(Continued)

FOREIGN PATENT DOCUMENTS

| | | |
|---|---|---|
| CN | 103857490 A | 6/2014 |
| CN | 107635749 A | 1/2018 |

(Continued)

OTHER PUBLICATIONS

International Search Report dated Nov. 16, 2020, in corresponding PCT/FR2020/051665 (5 pages).
(Continued)

*Primary Examiner* — Jenny R Wu
(74) *Attorney, Agent, or Firm* — VENABLE LLP

(57) ABSTRACT

A method (P) for determining trajectory followed by a laser beam for selective additive manufacture of a three-dimensional object comprises: a) determining, on a predetermined reference path $(T_i)$, a plurality of reference points $(T_{ij})$, b) determining a plurality of adjacent points $(T_{i+1j})$ located on the same side of the reference path, each adjacent point $(T_{i+1j})$ being associated with a reference point $(T_{ij})$ and
(Continued)

being such that a simulated adjacent melt zone that surrounds said adjacent point ($T_{i+1j}$) and a simulated reference melt zone that surrounds the reference point ($T_{ij}$) have an overlap corresponding to a fraction of a transverse width of the simulated reference melt zone that is comprised between a predetermined minimum fraction ($\alpha min$) and a predetermined maximum fraction ($\alpha max$), c) determining an adjacent path ($T_{i+1}$) passing through the plurality of determined adjacent points, and d) iterating steps a) to c) using the adjacent path, defined as a new reference path, so as to determine, on each iteration, a new adjacent path, all of the adjacent paths thus determined defining the trajectory.

11 Claims, 20 Drawing Sheets

(51) Int. Cl.

| | |
|---|---|
| *B22F 10/85* | (2021.01) |
| *B22F 12/49* | (2021.01) |
| *B33Y 10/00* | (2015.01) |
| *B33Y 30/00* | (2015.01) |
| *B33Y 50/02* | (2015.01) |
| *G05B 19/4099* | (2006.01) |

(52) U.S. Cl.

CPC .............. *B33Y 10/00* (2014.12); *B33Y 30/00* (2014.12); *B33Y 50/02* (2014.12); *G05B 19/4099* (2013.01); *G05B 2219/49023* (2013.01)

(56) References Cited

U.S. PATENT DOCUMENTS

| | | | |
|---|---|---|---|
| 9,501,821 | B2 | 11/2016 | Pfitzner et al. |
| 10,399,183 | B2 | 9/2019 | Dallarosa et al. |
| 10,926,336 | B2 | 2/2021 | Walrand et al. |
| 11,148,205 | B2 | 10/2021 | Zrodowski et al. |
| 2012/0143505 | A1 | 6/2012 | Giovannini et al. |
| 2013/0300035 | A1 | 11/2013 | Snis |
| 2014/0175071 | A1 | 6/2014 | Pfitzner et al. |
| 2017/0021454 | A1 | 1/2017 | Dallarosa et al. |
| 2017/0021455 | A1 | 1/2017 | Dallarosa et al. |
| 2018/0370144 | A1 | 12/2018 | Revanur et al. |
| 2019/0001440 | A1 | 1/2019 | Zrodowski et al. |
| 2019/0022946 | A1 | 1/2019 | Jones et al. |
| 2019/0054567 | A1 | 2/2019 | Roerig et al. |
| 2019/0217416 | A1 | 7/2019 | Brochu |
| 2019/0275585 | A1 | 9/2019 | Akram |
| 2021/0178481 | A1 | 6/2021 | Walrand et al. |

FOREIGN PATENT DOCUMENTS

| | | |
|---|---|---|
| CN | 108650883 A | 10/2018 |
| DE | 102011078276 B3 | 12/2012 |
| EP | 3498401 A1 | 6/2019 |
| JP | 2012-524626 A | 10/2012 |
| WO | 2010/124087 A1 | 10/2010 |
| WO | 2012/102655 A1 | 8/2012 |
| WO | 2014/199134 A1 | 12/2014 |

OTHER PUBLICATIONS

Office Action dated Sep. 2, 2024, in corresponding JP Application No. 2022-518716 (4 pages).

Figure 3

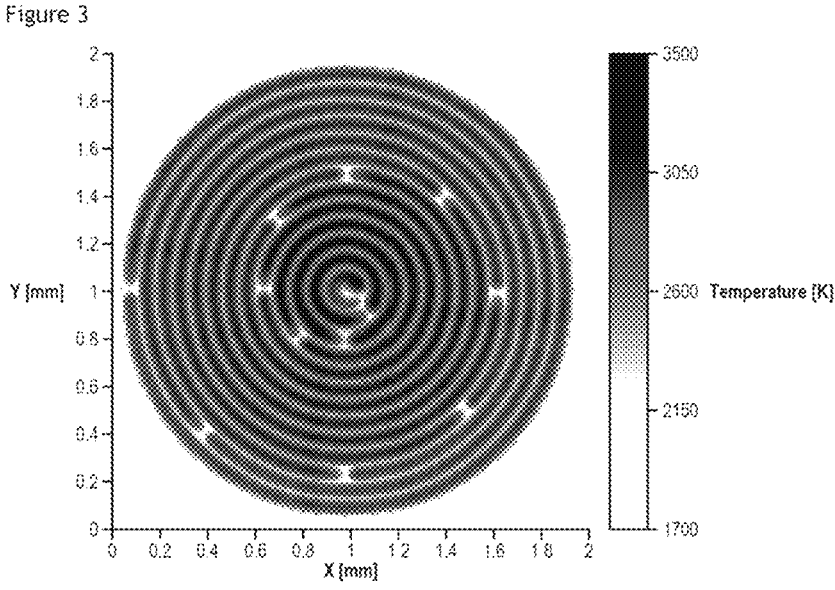

```
determining on a predetermined reference path Ti a          a)
plurality of reference points Tij
```

```
determining a plurality of adjacent points Ti+1j, the overlap between          b)
a reference simulated melt zone and an adjacent simulated melt
zone being a fraction of the reference simulated melt zone
comprised between a minimum fraction and a maximum fraction
```

```
determining an adjacent path Ti+1 passing through the plurality          c)
of determined adjacent points
```

```
iterating steps a) to c) using the determined adjacent          d)
path as new reference path
```

ADAPTIVE PATH FOR ADDITIVE MANUFACTURING USING A LASER SOURCE

FIELD OF THE INVENTION

The present invention relates to the general field of selective additive manufacturing.

PRIOR ART

Selective additive manufacturing consists in creating three-dimensional objects by consolidating selected zones in successive layers of pulverulent material (metal powder, ceramic powder, etc.). The consolidated zones correspond to successive cross sections of the three-dimensional object. Consolidation takes place for example layer by layer, through total or partial selective melting carried out using a power source.

Conventionally, high-power laser sources or electron beam sources are used as source to melt the layers of powder.

In the case of a process for manufacture of a three-dimensional object using a high-power laser source, it is possible to define the laser-scan trajectory as all of the adjacent paths travelled by the laser beam in each layer of powder, along which paths the substance is melted to define the outline and to fill the interior of the part.

The laser-scan trajectory has an important role that affects on the one hand the geometric quality and mechanical properties of the parts, and on the other hand the efficiency of the process, in terms of speed and productivity.

Scan pitch is an important parameter to be defined with the laser-scan strategy. It is the distance separating two adjacent paths of the trajectory.

In general, during the manufacture of a part using a selective-laser-melting (SLM) process, use of a trajectory made up of adjacent paths separated by a set scan pitch may cause certain problems.

Depending on the shape of the trajectory or the geometry of the part, thermally isolated zones may exist, this leading to a build-up of heat and to the appearance of overheated zones.

The increase in temperature in these local zones causes high thermal gradients. These gradients in turn lead to the appearance of residual stresses that have a negative effect on the mechanical characteristics of the part.

Also, in the case of overheating, the "keyhole" regime may appear. This phenomenon causes pores to be created in the part. Specifically, in this case, the depth of the melt pool becomes large and the temperature reaches the vaporization temperature of the substance. This results in vaporization and the formation of gas at the bottom of the pool, which creates a recoil pressure therein. Due to the instability and rapid cooling of the melt pool, the formed gases cannot escape and get trapped in the substance. Given the depth of the formed pore, melting the next layer does not allow the surrounding material to be melted and the gas to be released.

In addition, the recoil pressure in the melt pool causes the Marangoni effect to appear, this resulting in the appearance of splashing and in the ejection of material from the melt pool. Beads of material thus extracted are then redeposited on the already solidified surface and may hinder the deposition of the next layer, or even damage the powder-depositing device and block the manufacturing process.

Using a very high scan pitch, especially in the case of a material of low thermal conductivity, may give rise to unmelted zones between adjacent paths, causing pores in the part. This problem directly influences the mechanical properties of the obtained parts and the quality of their surfaces.

In the case of processes for melting a powder bed by laser, the scan pitch (p) is generally computed as a function of the diameter of the laser beam (D), according to the formula $p=(1-\lambda) \times D$ with $\lambda$ the overlap coefficient. The value of the overlap coefficient is comprised between 0 and 1.

Representation of Two Adjacent Paths

FIG. 1 is a schematic representation of a laser-scan trajectory 1 made up of two adjacent paths 3 and 5 in the case of a constant scan pitch 2 with a laser beam of constant diameter 24. FIG. 1 corresponds to an overlap coefficient $\lambda$ equal to 30%. For a diameter of the laser beam 24 equal to 100 μm, the scan pitch 2 is equal to 70 μm.

The laser beam is emitted toward the layer of powder and moved along the adjacent paths, so that the point 9 of the adjacent path 5 is at a certain moment irradiated by the laser spot 11.

The laser spot is the laser spot corresponding to a cross section of the laser beam located at the intersection between the laser beam and the layer of powder.

The laser delivers enough energy locally to make the layer of powder melt. During the scan, the powder is melted within a melt region 12 of the layer of powder surrounding the adjacent path 3, and within a melt region 14 of the layer of powder surrounding the adjacent path 5.

The transverse width of the region 12 may be characterized as being the total width 13a in a direction transverse to the scan direction of the laser beam. The transverse width of the region 12 allows the dimension of the region 12 in the direction orthogonal to the direction of the reference path, which is also the direction of the laser scan, to be evaluated.

The transverse width of the region 14 is characterized by the total width 15a.

The adjacent paths are separated by the scan pitch 2. At point 20 of the adjacent path 3, the tangent 19 to the adjacent path 3 has been shown. The vector 21 is orthogonal to the tangent 19 and of length equal to the scan pitch 2. The vector 21 makes it possible to pass from the point 20 of adjacent path 3 to the point 22 of adjacent path 5. The paths 3 and 5 are connected throughout by this type of local construction, and the length of the vector making it possible to pass from a point on path 3 to a point on path 5 remains constant and equal to the pitch 2.

Taking into account the pitch 2 separating the paths 3 and 5 and taking into account the widths 13b and 15b of the regions 12 and 14, there is an overlap 23 between the regions 12 and 14.

The overlap 23 is a transverse length of a portion of a melt region or of a melt zone. It is a transverse length of the portion of the layer of powder that was melted during the passage of the laser beam over the first path 3 and that remelted during the passage of the laser beam over the second path 5. In other words, the overlap is a transverse length of the common portion between the melt regions surrounding two adjacent paths. The overlap should be evaluated locally, as it is not of constant value everywhere along the adjacent paths.

In FIG. 1, the overlap 23 is a transverse length of the common portion of the melt regions 12 and 14.

The degree of overlap between two adjacent paths is equal to the ratio of the overlap 23 to the transverse width of the adjacent path scanned first by the laser beam, here the total width 13a.

Generally, the adjacent paths may be denoted in the form $T_i$ indexed by i in the chronological order in which they are scanned by the laser beam.

A j-th point of the path $T_i$ may be denoted $T_{ij}$ and identified by a position vector $$\vec{T}_{ij}$$

With a constant scan pitch p, a relationship relates points $T_{ij}$ and $T_{i+1j}$ located facing each other, taking the form $$\vec{T}_{i+1j} = \vec{T}_{ij} + p\,\vec{n}_{ij}$$

with $$\vec{n}_{ij}$$

a unit vector locally orthogonal to the path $T_i$ at point $T_{ij}$, comprised in the plane of the layer of powder and directed from the path $T_i$ to the path $T_{i+1}$.

In the case of a trajectory of set pitch, the value and non-uniformity of the degree of overlap depends on the material, on parameters of the process and on the geometry of the trajectory.

For example, the scan of an area of a first material and the scan of another area of a second material of higher conductivity with the same trajectory parameters and in particular the same set pitch corresponding to the same overlap coefficient generates a different degree of overlap in each case.

The melt region is wider in the case of the second material, thus leading to a greater degree of overlap.

Regarding the non-uniformity of the degree of overlap, the presence of curvatures results in heat build-up and thus leads to an increase in the transverse width of the melt region. This generates a greater degree of overlap in this local zone of curvature.

Case of a Trajectory Formed from Concentric Circles

FIG. 2 schematically shows a laser-scan trajectory chosen to manufacture a part having a disc shape. It is a trajectory made up of circular and concentric adjacent paths. The adjacent paths are spaced apart regularly by a constant pitch equal to 70 μm.

FIG. 3 schematically shows a field of the maximum temperature reached by the powder, as it is scanned by a laser beam along the laser-scan trajectory shown in FIG. 2. The first adjacent path scanned by the laser beam is located at the centre of the part.

The scan speed and laser power remain constant during the scan.

FIG. 3 was generated by digital simulation of the temperature during the manufacturing process.

For each studied point, it is possible to generate a time series of temperatures reached by the powder at this point during the process.

It is possible to extract, from this time series, the maximum of its values, which maximum corresponds to the maximum temperature reached by the powder at the studied point during the process.

The field shown in FIG. 3 of the maximum temperature at each point in the area demonstrates the influence of trajectory on thermal behaviour during manufacture. The map of the maximum-temperature field reveals a higher maximum temperature at the centre of the part and a lower maximum temperature at the edges of the part. The maximum recorded temperature is equal to 3300 K and the minimum value is equal to 2000 K.

It is possible to determine the degree of overlap obtained with this laser-scan trajectory: the overlap varies between 100% at the centre and 39% at the edges in the case of FIG. 3.

The observed result may be explained by the effect of the trajectory on the temperature of the powder before consolidation, which is an estimate of the temperature of the layer of powder just before the passage of the laser. This estimate characterizes, at a point of the layer of powder, just before the laser passes through this point, the diffusion of the energy delivered by the laser beam during the scan of the portion of the laser-scan trajectory located upstream of the point.

At the start of the laser scan of the layer of powder at the centre of the part, the lengths of the adjacent paths are small and hence, between the passage of the laser from one adjacent path to the next adjacent path, little time passes and the temperature of the powder before consolidation is high. This leads to a high maximum temperature and to the entire zone at the centre of the part remelting on each scan of an adjacent path.

Further along the laser-scan trajectory, away from the centre, the lengths of the adjacent paths are longer and hence, between the passage of the laser from one adjacent path to the next adjacent path, more time passes and the temperature of the powder before consolidation is lower.

This leads to a lower maximum temperature, to a stabilization of the transverse width of the melt zone, i.e. there is less spattering of substance, and lastly to a lower degree of overlap.

Indicators of Overlap Quality

To characterize the overlap along the trajectory, indicators may be defined with the objective of determining and evaluating zones of optimal overlap, zones of overheating, i.e. zones of excessive overlap, and zones where there is not enough melting between adjacent melt zones, i.e. zones of insufficient overlap.

The optimum-quality indicator $I_{qop}$ allows zones in which overlap is optimal to be evaluated. The overlap is said to be optimal when the degree of overlap is comprised in a tolerance interval defined between a predetermined minimum fraction and a predetermined maximum fraction.

It may be estimated that a degree of overlap equal to 15% is sufficient to ensure the continuity of the melting of the layer of powder of a path adjacent to the next adjacent path. It is possible to choose a tolerance interval centred on a target degree of overlap equal to 15%, the predetermined minimum fraction equal to 12% and predetermined maximum fraction equal to 18%.

The optimum-quality indicator $I_{qop}$ is computed by finding the ratio of the length of the adjacent-path segments in which the degree of overlap is comprised in the tolerance interval, to the total length of the trajectory.

The over-quality indicator $I_{sq}$ is computed by finding the ratio of the length of the adjacent-path segments in which the degree of overlap is above the tolerance interval, to the total length of the trajectory.

The non-quality indicator $I_{nq}$ is computed by finding the ratio of the length of the adjacent-path segments in which the degree of overlap is below the tolerance interval, to the total length of the trajectory.

For a given laser-scan trajectory, the sum of these three indicators is always equal to 100%. $I_{qop} + I_{sq} + I_{nq} = 100\%$.

A laser-scan trajectory is optimal in terms of overlap when the indicator $I_{qop}$ is equal to 100% and the other indicators $I_{sq}$ and $I_{nq}$ are equal to zero.

In the case of the laser-scan trajectory corresponding to FIG. 3 and of a constant pitch equal to 70 μm, the minimum measured degree of overlap is equal to 39%. Therefore, the over-quality indicator $I_{sq}$ is equal to 100% and the other indicators are equal to 0. In other words, everywhere along the trajectory there are zones of overheating.

In order to improve the quality of the trajectory, a first option consists in increasing the scan pitch. The shape of the trajectory formed from concentric circles is preserved, these circles being spaced apart from one another more than in the case of FIG. 2. A new value of the constant scan pitch may be computed so as to obtain zones in which the degree of overlap is within the tolerance interval and to prevent zones in which the degree of overlap is outside of the tolerance interval.

The computed value of the new scan pitch is 95 µm, larger than in the laser-scan trajectory of FIG. 2.

This time, the maximum temperature recorded is equal to 3200 K and the minimum temperature is equal to 1750 K.

Measuring the degree of overlap allows the value of the indicators to be established: $I_{sq}$=50.91% and $I_{qop}$=49.09%.

Only two types of zones are present, over-quality zones and optimal-quality zones. There are no non-quality zones.

Increasing scan pitch improved overlap, but this is unsatisfactory.

It will be noted that by using constant pitches of a value greater than 95 µm, non-quality zones appear, this producing unmelted zones in the layer of powder.

It will be noted that high degrees of overlap lead, in addition to zones of overheating, to spattering and to defects in the part, and to a longer production time.

There is therefore a need to optimize the overlap of adjacent paths in order to guarantee a more uniform thermal distribution within the layer of powder while avoiding unmelted zones and decreasing production times.

SUMMARY OF THE INVENTION

A general aim of the invention is to overcome the drawbacks of prior-art additive-manufacturing processes.

In particular, one aim of the invention is to provide a way of better controlling the temperature field during the process and of guaranteeing a more uniform thermal distribution within the layer of powder.

Another aim of the invention is to provide a way of optimizing the overlap of adjacent paths in laser-scan trajectories while avoiding unmelted zones.

Another aim of the invention is to provide a way of decreasing production times.

The aim is achieved within the context of the present invention by virtue of a method for determining trajectory followed by a laser beam for selective additive manufacture of a three-dimensional object, the laser beam being intended to be emitted toward a layer of powder and moved along a trajectory made up of a plurality of adjacent paths in order to cause the layer of powder to melt, the paths being determined by implementing the following steps:

a) determining, on a predetermined reference path, a plurality of reference points, b) determining a plurality of adjacent points located on the same side of the reference path, each adjacent point being associated with a reference point and being such that a simulated adjacent melt zone that surrounds said adjacent point and a simulated reference melt zone that surrounds the reference point have an overlap corresponding to a fraction of a transverse width of the simulated reference melt zone that is comprised between a predetermined minimum fraction and a predetermined maximum fraction, c) determining an adjacent path passing through the plurality of determined adjacent points, d) iterating steps a) to c) using the adjacent path, defined as a new reference path, so as to determine, on each iteration, a new adjacent path, all of the adjacent paths thus determined defining the trajectory intended to be followed by the laser beam, said trajectory being stored and/or transmitted to a control unit of a selective-additive-manufacturing apparatus.

Such a method is advantageously supplemented by the following various features implemented on their own or in combination: the step of determining several adjacent points comprises successively, for each adjacent point in one direction of travel of the trajectory, the following steps:

estimating, for the reference point associated with the adjacent point, a transverse width of the reference simulated melt zone, determining a possible position of the adjacent point, the distance separating the possible position of the adjacent point from the position of the reference point being equal to the product of the transverse width of the reference simulated melt zone and of a predetermined target degree of overlap, the adjacent point being placed with respect to the reference point in a direction that is orthogonal to the reference path at the reference point, comprised in the plane of the layer of powder and directed from the reference path toward the adjacent path, carrying out in a loop the following secondary steps:

estimating a possible transverse width of the adjacent simulated melt zone, estimating a possible overlap between the reference simulated melt zone and the adjacent simulated melt zone, resuming the loop of secondary steps while modifying the possible position of the adjacent point if the estimated possible overlap corresponds to a fraction of the reference simulated melt zone less than the predetermined minimum fraction or greater than the predetermined maximum fraction;

determining a dissimilarity between the estimated possible overlap and a target overlap equal to the product of the transverse width of the reference simulated melt zone and of the target degree of overlap;

the target degree of overlap is equal to 15%, the minimum fraction is equal to 12% and the maximum fraction is equal to 18%;

to estimate a possible overlap between the reference simulated melt zone and the simulated adjacent melt zone, the half-sum of a transverse width of the reference simulated melt zone and of a possible transverse width of the simulated adjacent melt zone subtracted from the distance separating the possible position of the adjacent point and the position of the reference point is determined;

when resuming the loop of secondary steps, the possible position of the adjacent point is modified so that the distance separating the possible position of the adjacent point and the position of the reference point is replaced by the difference between said distance and the dissimilarity between the estimated possible overlap and the product of the transverse width of the reference simulated melt zone and of the target degree of overlap;

the step of estimating a transverse width of a simulated melt zone that surrounds a study point located on the layer of powder, comprises the following steps:

determining a plurality of computation points, the computation points being points of the layer of powder that are located in a neighbourhood of the study point, estimating a maximum temperature reached at each of the computation points, the estimate depending on variations in temperature due to emission of a laser beam so as to consolidate zones of the layer of powder surrounding upstream points located on the plurality of paths upstream of a passage of the laser beam to the study point, and the estimate depending on a variation in temperature of the powder at the computation point due to emission of a laser beam so as to consolidate a zone of the layer of powder surrounding the study point, comparing the maximum temperature reached thus estimated with the melting point of the powder, identifying, among the computation points, melted points for which the estimate of the maximum temperature reached is greater than or equal to the melting point of the powder, estimating a transverse width of a zone occupied by said melted points; the step of estimating a maximum temperature at a computation point comprises the following steps:

computing, for each upstream point, an estimate of a variation in temperature of the powder at the computation point due to emission of a laser beam so as to consolidate a zone of the layer of powder surrounding the upstream point, computing an estimate of variations in temperature of the powder at the computation point due to emission of a laser beam so as to consolidate zones of the layer of powder surrounding upstream points, computing an estimate of a variation in temperature of the powder at the computation point due to emission of a laser beam so as to consolidate a zone of the layer of powder surrounding the study point, computing an estimate of a temperature of the powder at the computation point depending on the estimates of the variations in temperature due to emission of a laser beam so as to consolidate zones of the layer of powder surrounding the study point or upstream points, computing an estimate of a maximum temperature at the computation point; the step of estimating, for each upstream point, an estimate of a variation in temperature of the powder at the computation point due to emission of a laser beam so as to consolidate a zone of the layer of powder surrounding the upstream point, comprises the following steps:

computing, for each upstream point, a distance separating the study point and said upstream point, comparing said distance to a predetermined spatial-neighbourhood distance, estimating as zero, for each upstream point separated from the study point by a distance greater than the spatial-neighbourhood distance, a variation in temperature of the powder at the computation point due to emission of a laser beam so as to consolidate a zone of the layer of powder surrounding the upstream point;

the step of estimating, for each upstream point, an estimate of a variation in temperature of the powder at the computation point due to emission of a laser beam so as to consolidate a zone of the layer of powder surrounding the upstream point, comprises the following steps:

computing, for each upstream point, a duration separating emission of a laser beam so as to consolidate a zone of the layer of powder surrounding the upstream point and the passage of the laser beam to the study point, comparing said duration to a predetermined temporal-neighbourhood duration, estimating as zero, for each upstream point the computed duration of which is greater than the temporal-neighbourhood duration, a variation in temperature of the powder at the computation point due to emission of a laser beam so as to consolidate a zone of the layer of powder surrounding the upstream point.

The invention also relates to a process for selective additive manufacture of a three-dimensional object from a layer of powder, the process comprising, in a selective-additive-manufacturing apparatus, the following steps:

applying a layer of additive-manufacturing powder to a carrier or to a previously consolidated layer, emitting a laser beam onto the layer of powder following a trajectory made up of a plurality of adjacent paths, the passage of the laser beam over these paths causing the layer of powder to melt, the trajectory being determined by implementing a trajectory-determining method such as presented above, said trajectory being stored and/or transmitted to a control unit of the selective-additive-manufacturing apparatus.

The invention also relates to an apparatus for the selective additive manufacture of a three-dimensional object from a layer of powder, the apparatus comprising:

a powder reservoir located above a horizontal plate, an arrangement for distributing said metal powder to the plate, and configured to successively spread a plurality of layers of powder, a laser source, a control unit that is configured to control the laser source so as to emit a laser beam onto the layer of powder following a trajectory made up of a plurality of adjacent paths, the passage of the laser beam over these paths causing the layer of powder to melt, and a memory that communicates with the control unit and in which a trajectory determined by implementing a trajectory-determining method such as presented above is stored.

Such an apparatus may advantageously be supplemented by a computer suitable for implementing a trajectory-determining method such as presented above.

Lastly, the invention relates to a computer program comprising instructions suitable for implementing at least one of the steps of the trajectory-determining method such as presented above when said program is executed on a computer.

PRESENTATION OF THE FIGURES

Further features and advantages of the invention will become more apparent from the following description, which is purely illustrative and non-limiting and should be read in conjunction with the appended drawings, in which:

FIG. 1, already presented, is a schematic representation of a laser-scan trajectory comprising two adjacent paths;

FIG. 2, already presented, is a schematic representation of a laser-scan trajectory according to a known prior-art technique;

FIG. 3, already presented, schematically shows a field of the maximum temperature reached by the powder, when the layer of powder is scanned by a laser beam according to a known prior-art technique;

FIG. 4 is a schematic representation of a method for determining a laser-scan trajectory according to the invention;

Figure 6:
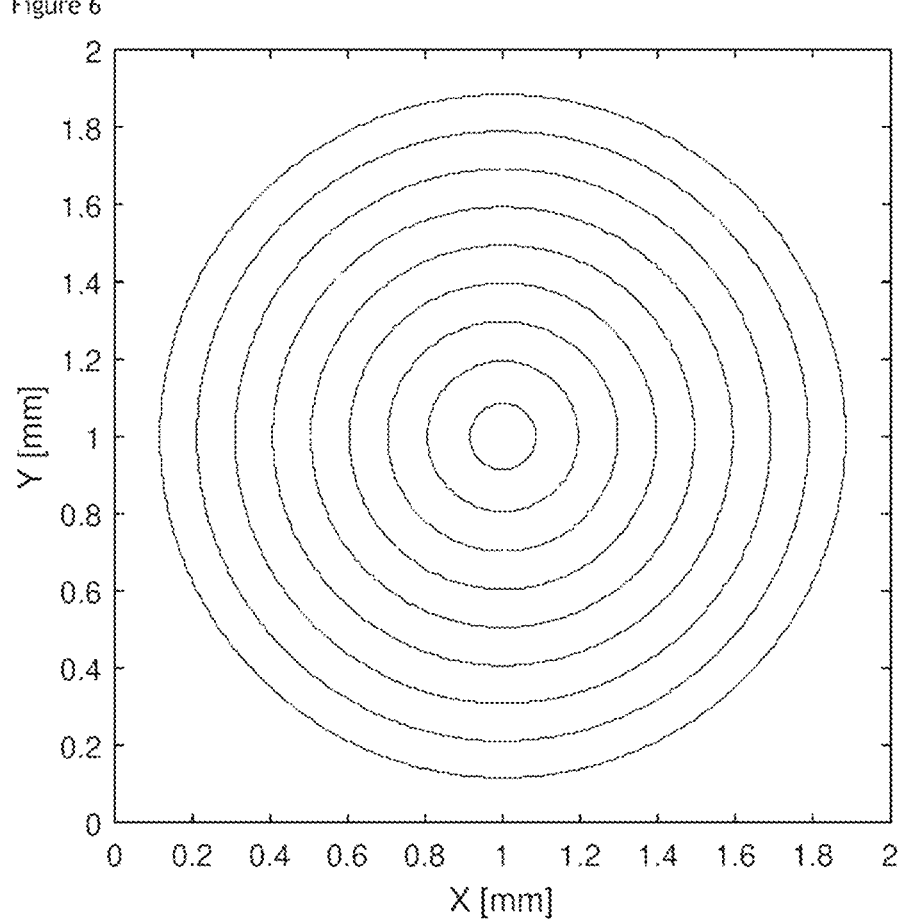
Figure 7:
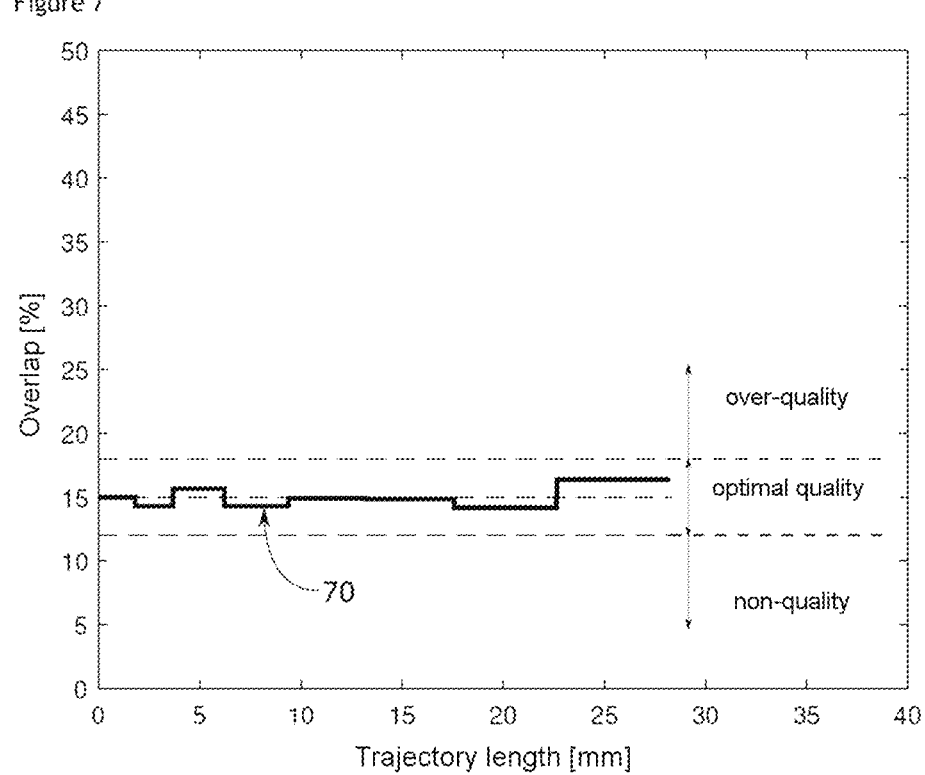
Figure 8:
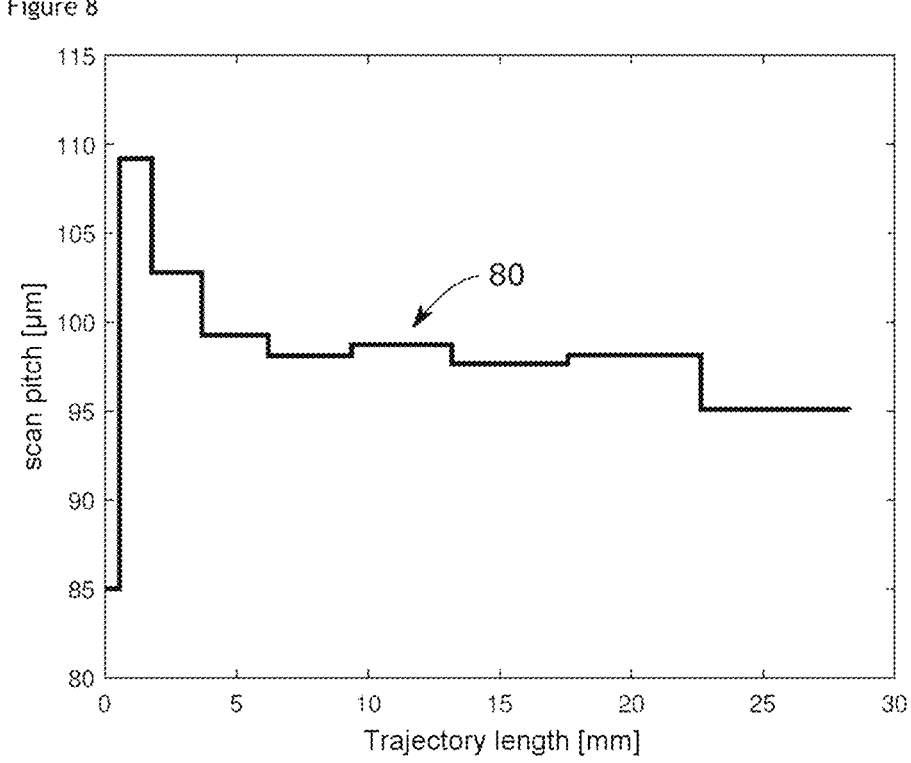
Figure 9:
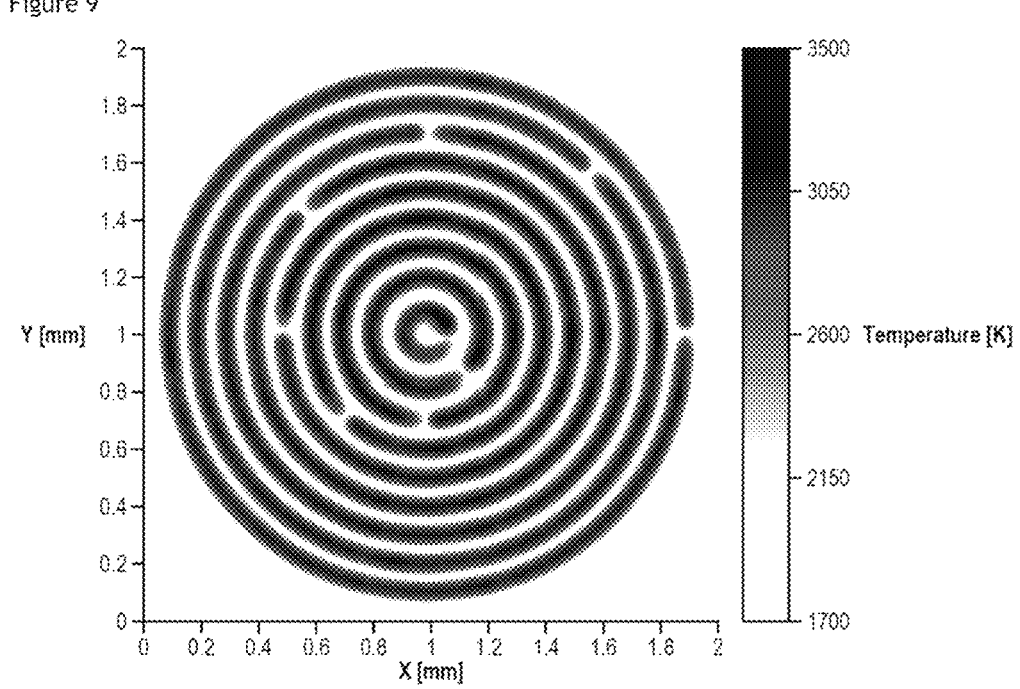
Figure 10:
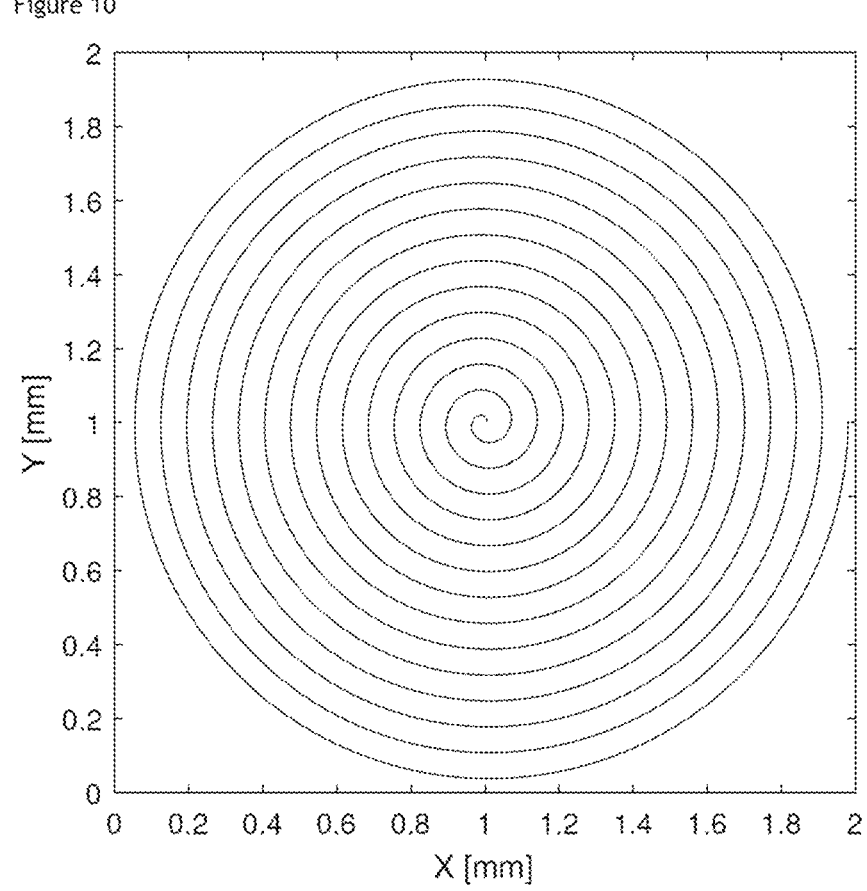
Figure 11:
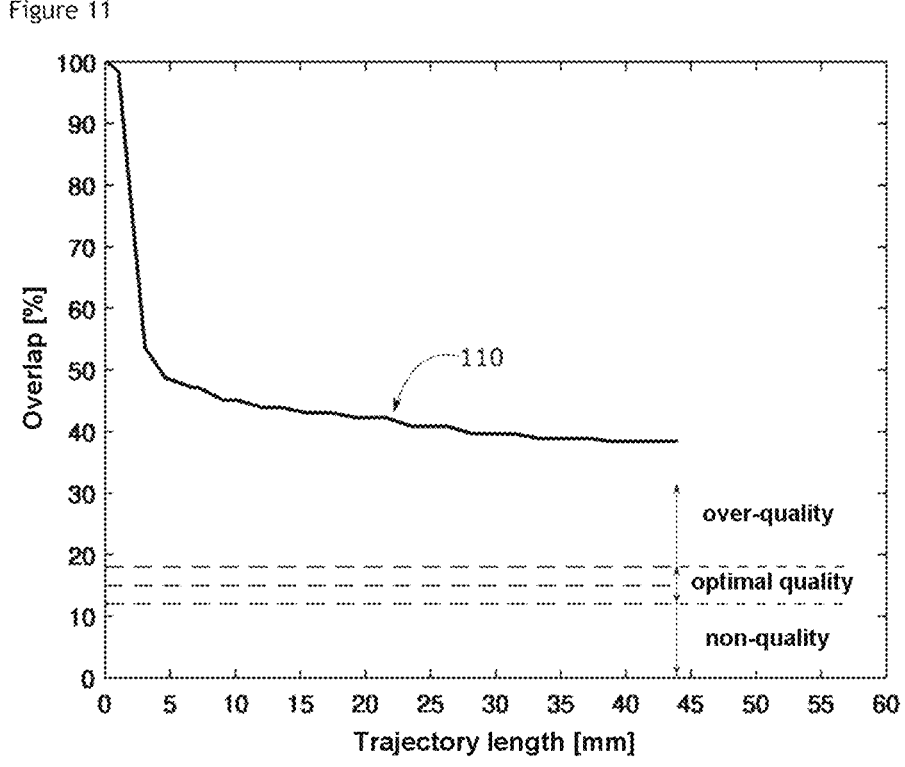
Figure 12:
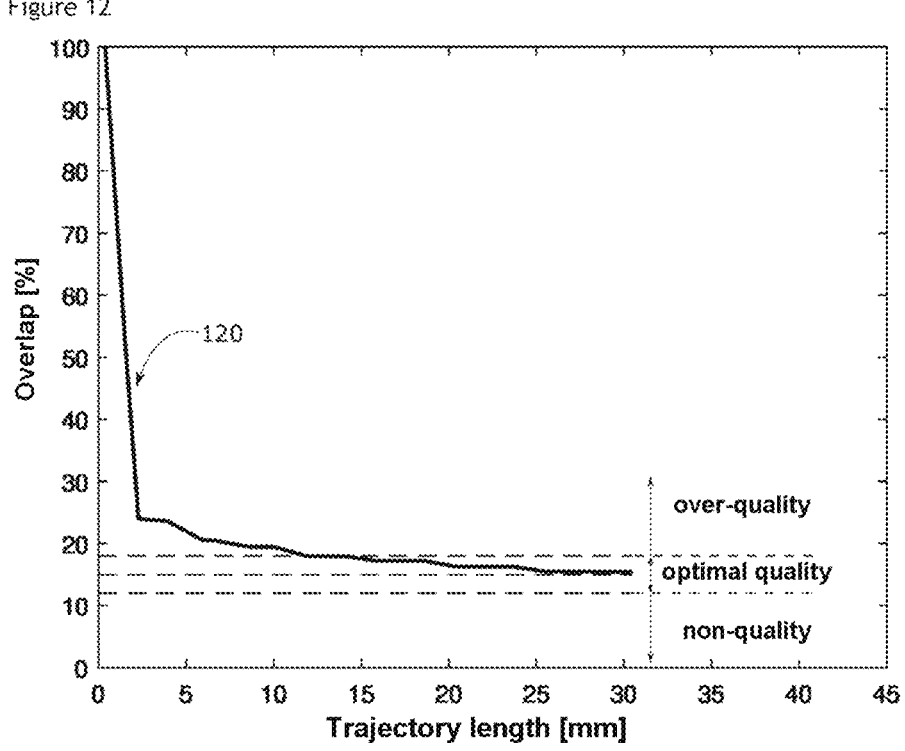
Figure 13:
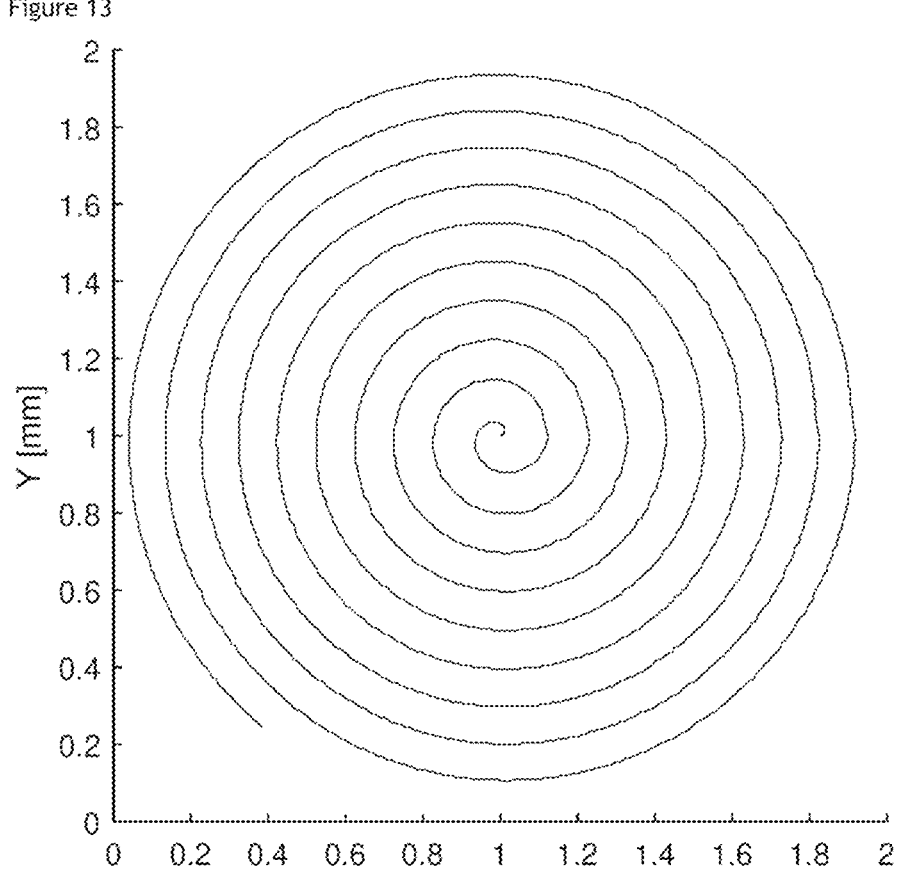
Figure 14:
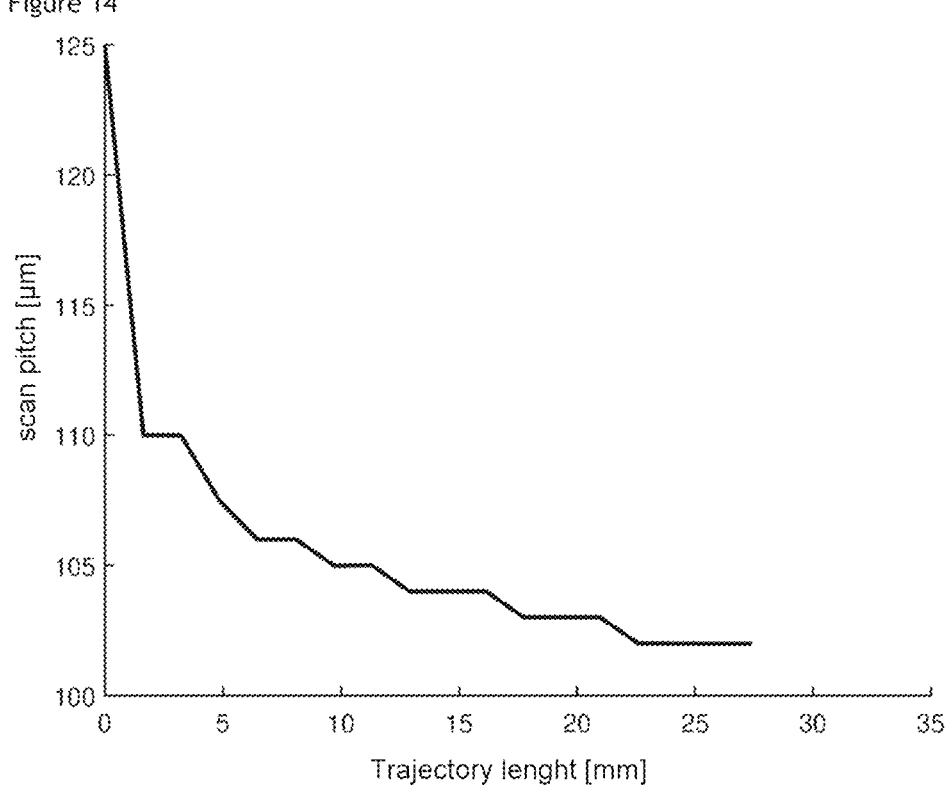
Figure 15:
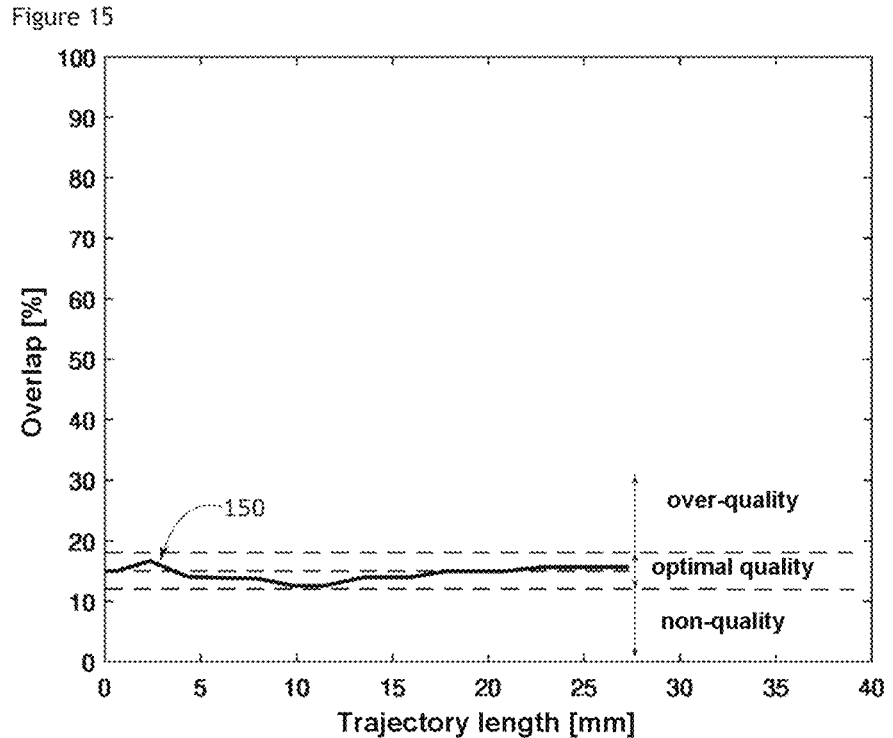
Figure 16:
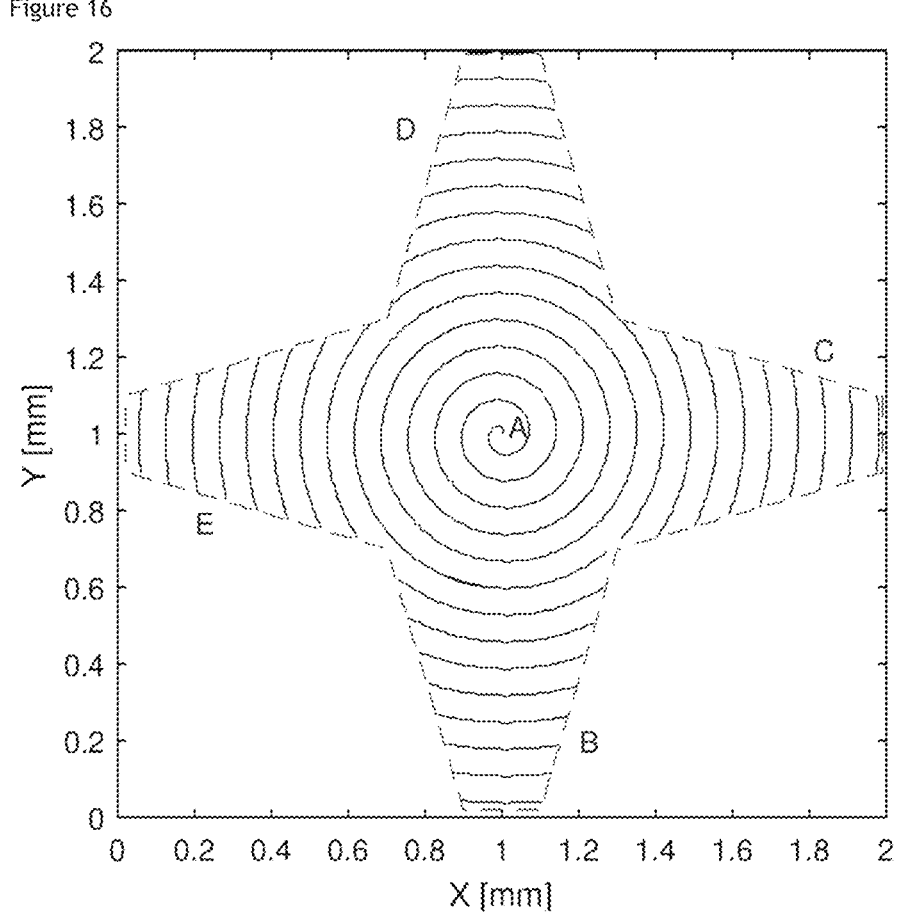
Figure 17:
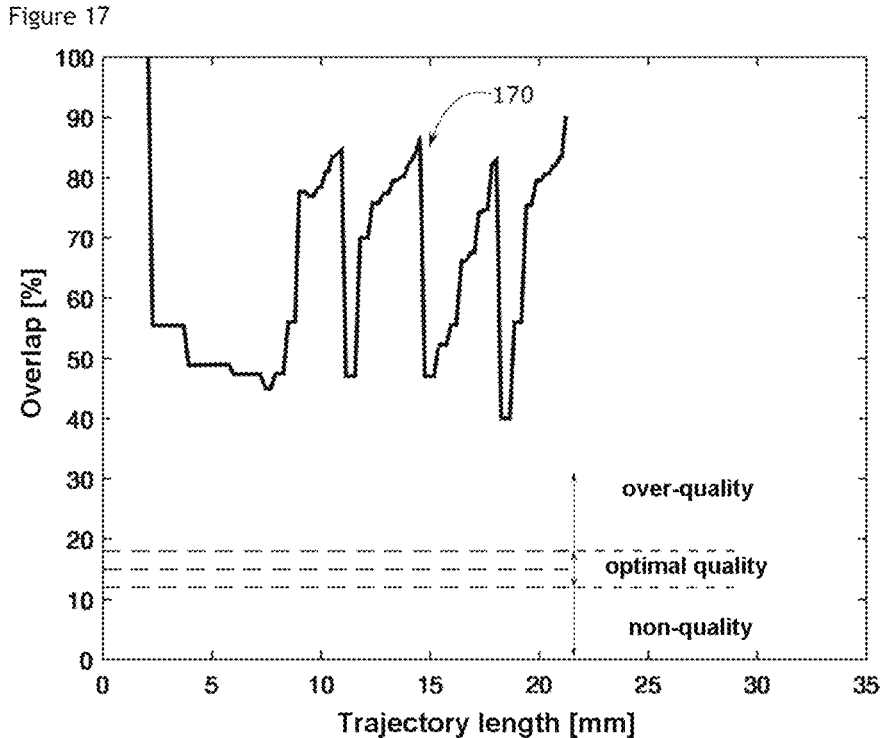
Figure 18:
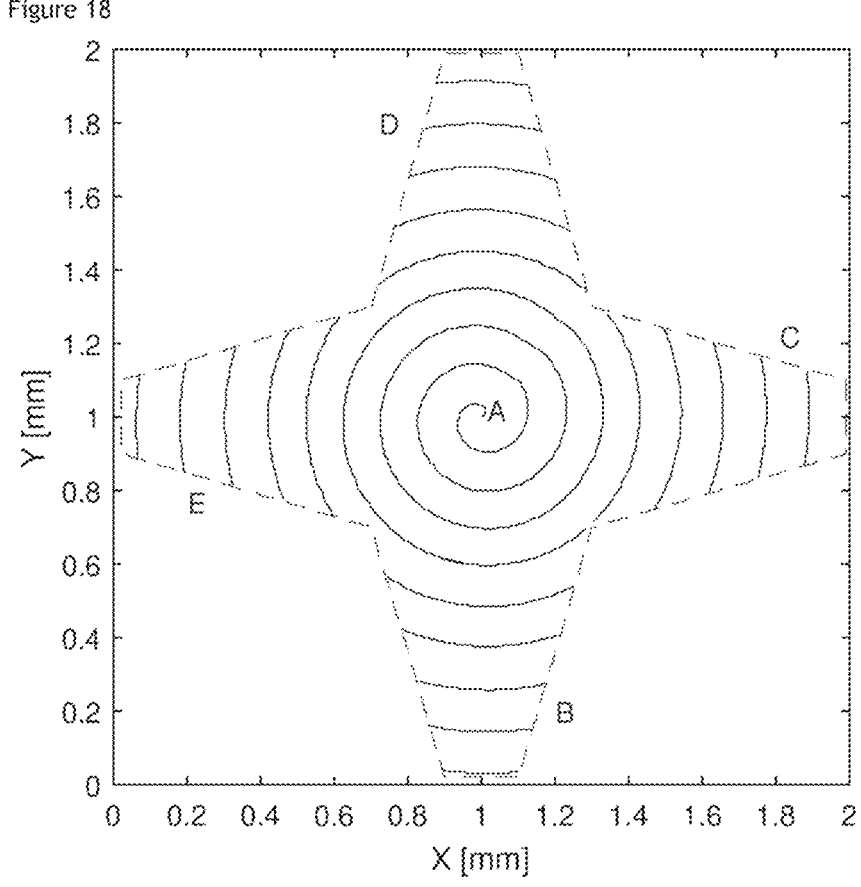
Figure 19:
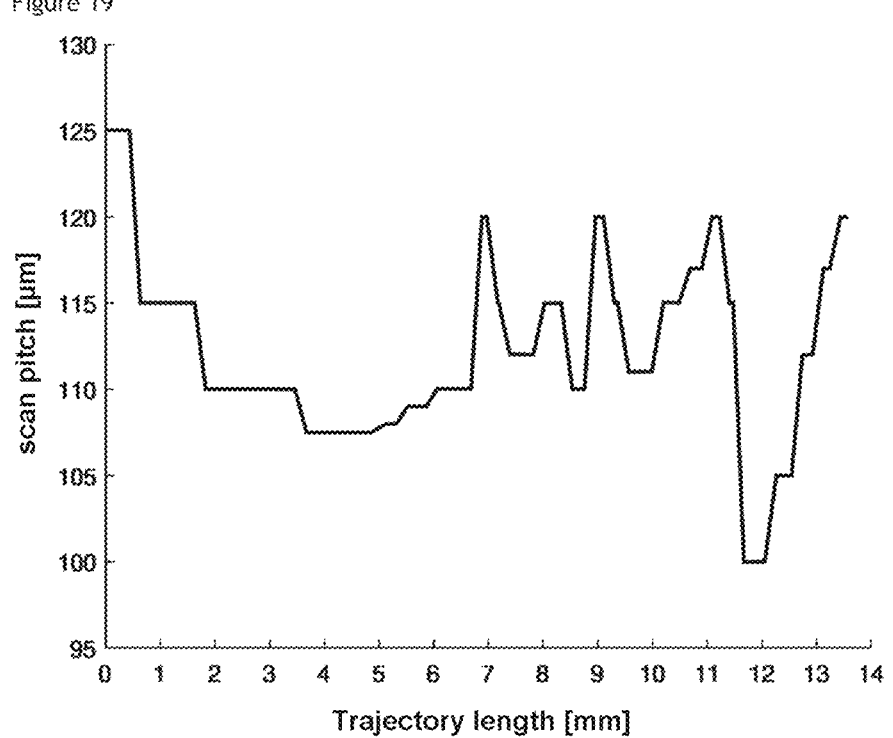
Figure 20:
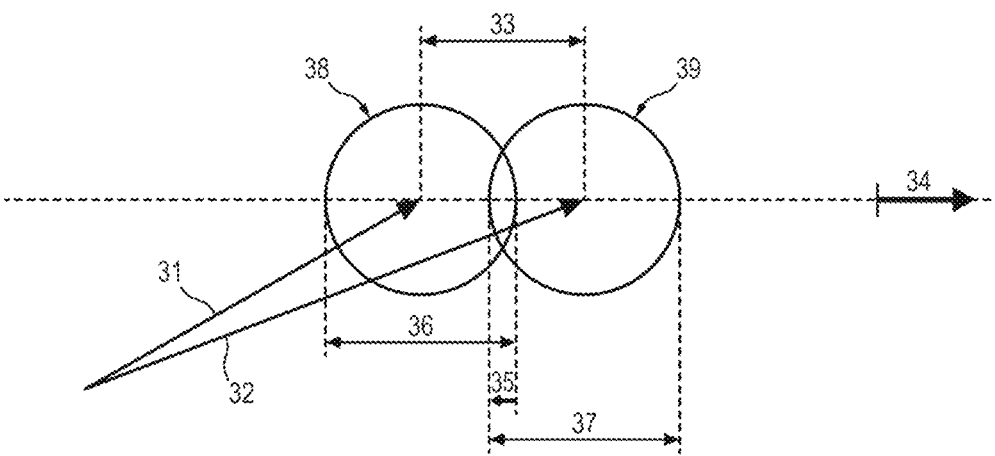
Figure 21:
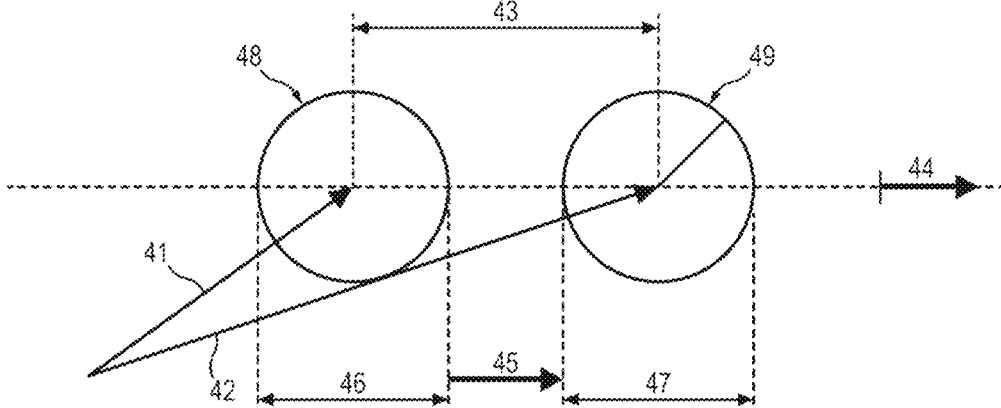
Figure 22:
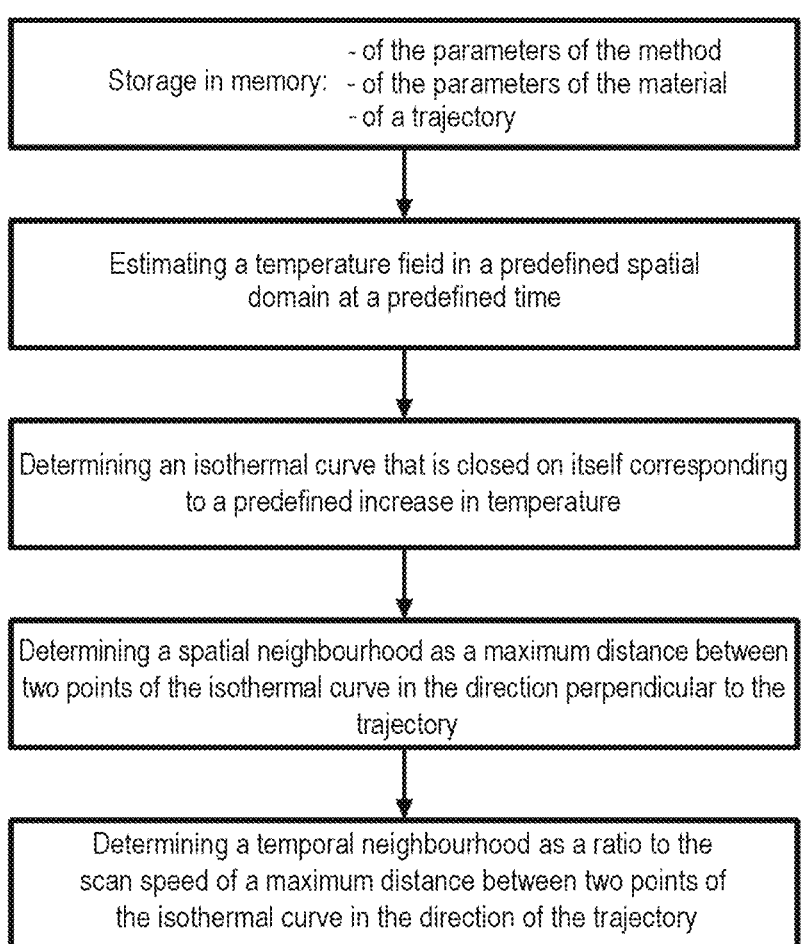
Figure 23:
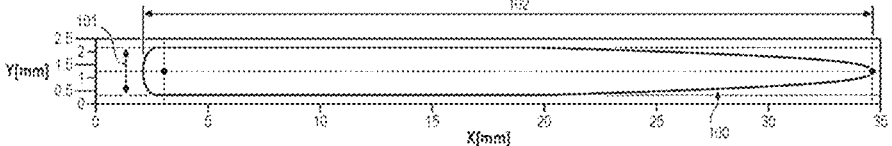
Figure 24:
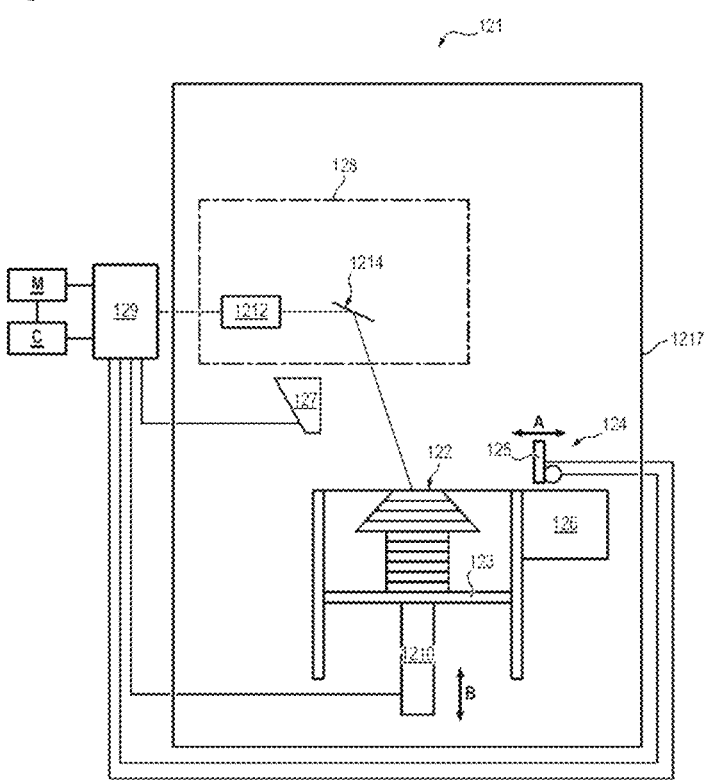

FIG. 6 schematically shows a laser-scan trajectory;

FIG. 7 schematically shows the degree of overlap associated with a laser-scan trajectory;

FIG. 8 schematically represents the scan pitch associated with a laser-scan trajectory;

FIG. 9 schematically shows a field of the maximum temperature reached by the powder, when the layer of powder is scanned by a laser beam along a laser-scan trajectory;

FIG. 10 is a schematic representation of a laser-scan trajectory according to a known prior-art technique;

FIGS. 11 and 12 schematically show the degree of overlap associated with laser-scan trajectories according to a known prior-art technique;

FIG. 13 is a schematic representation of a laser-scan trajectory;

FIG. 14 schematically represents the scan pitch associated with a laser-scan trajectory;

FIG. 15 schematically shows the degree of overlap associated with a laser-scan trajectory;

FIG. 16 is a schematic representation of a laser-scan trajectory according to a known prior-art technique;

FIG. 17 schematically shows the degree of overlap associated with a laser-scan trajectory according to a known prior-art technique;

FIG. 18 is a schematic representation of a laser-scan trajectory;

FIG. 19 schematically represents the scan pitch associated with a laser-scan trajectory;

FIGS. 20 and 21 are schematic representations of simulated melt zones in two different overlap configurations;

FIG. 22 schematically shows a method for determining a spatial neighbourhood and a temporal neighbourhood of a point of the layer of powder;

FIG. 23 schematically shows a spatial neighbourhood and a temporal neighbourhood of a point of the layer of powder;

FIG. 24 is a schematic representation of an additive-manufacturing apparatus according to one possible embodiment of the invention.

DESCRIPTION OF ONE OR MORE MODES OF IMPLEMENTATION AND OF EMBODIMENT

Adaptive Trajectories Formed from Adjacent Paths

Such as shown in FIG. 4, a method that allows a trajectory formed from a plurality of adjacent paths that are determined recursively to be constructed is provided. The method allows the trajectory followed by a laser beam for selective additive manufacture of a three-dimensional object to be determined, the laser beam being intended to be emitted toward a layer of powder and moved along a trajectory made up of a plurality of adjacent paths in order to cause the layer of powder to melt, the paths being determined by implementing the following steps:

a) determining, on a predetermined reference path $T_i$, a plurality of reference points $T_{ij}$, b) determining a plurality of adjacent points $T_{i+1j}$ located on the same side of the reference path, each adjacent point $T_{i+1j}$ being associated with a reference point $T_{ij}$ and being such that a simulated adjacent melt zone that surrounds said adjacent point $T_{i+1j}$ and a simulated reference melt zone that surrounds the reference point $T_{ij}$ have an overlap corresponding to a fraction of a transverse width of the simulated reference melt zone that is comprised between a predetermined minimum fraction $\alpha min$ and a predetermined maximum fraction $\alpha max$, c) determining an adjacent path $T_{i+1}$ passing through the plurality of determined adjacent points, d) iterating steps a) to c) using the adjacent path, defined as a new reference path, so as to determine, on each iteration, a new adjacent path, all of the adjacent paths thus determined defining the trajectory intended to be followed by the laser beam, said trajectory being stored and/or transmitted to a control unit of a selective-additive-manufacturing apparatus.

The reference path $T_i$ is predetermined either because it was initially chosen at the start of the method or because it was determined during the method and it is subsequently used to determine a new adjacent path.

For each reference point, an adjacent point is determined. The number of reference points determined within the reference path allows a relatively good or poor definition of the adjacent path. The higher the chosen number of reference points, the better the adjacent path is defined. The number of reference points may in particular be chosen depending on an expected length of the adjacent path.

For each reference point, the determination of the associated adjacent point takes into account two simulated melt zones: a simulated adjacent melt zone that surrounds an adjacent point $T_{i+1j}$ and a simulated reference melt zone that surrounds the reference point $T_{ij}$. It is a question of an estimate of the region of the layer of powder surrounding the adjacent point or reference point that would turn liquid if the laser scanned the trajectory as determined.

More precisely, the method takes into account the overlap between the two simulated melt zones so that the estimated degree of overlap is comprised between a predetermined minimum fraction ($\alpha min$) and a predetermined maximum fraction ($\alpha max$).

The degree of overlap between simulated melt zones is equal to the ratio of the overlap to the transverse width of the melt zone associated with the adjacent path scanned first by the laser beam, here the reference path.

The preliminary estimation of the melt zones allows an adjacent point to be placed with respect to a reference point so as to obtain an overlap within a tolerance interval.

The overlap of the melt regions generated during the method is thus optimized.

Complete remelting of a zone already melted in a first laser scan or the presence of unmelted portions of the layer of powder may thus be avoided.

Setting the maximum fraction $\alpha max$ allows zones of overheating to be limited and setting the minimum fraction $\alpha min$ allows unmelted zones to be limited. In this way, control of the uniformity of the temperature field during the manufacturing process is increased.

The trajectory-determining method may be specified in the determination of a plurality of adjacent points $T_{i+1j}$, which determination may comprise, successively, in one direction of travel of the trajectory, for each adjacent point $T_{i+1j}$ the following steps:

estimating, for the reference point $T_{ij}$ associated with the adjacent point $T_{i+1j}$, a transverse width $L_{ij}$ of the reference simulated melt zone, determining a possible position of the adjacent point $T_{i+1j}$, the distance separating the possible position of the adjacent point $T_{i+1j}$ from the position of the reference point $T_{ij}$ being equal to the product of the transverse width of the reference simulated melt zone and of a predetermined target degree of overlap $\alpha c$, the adjacent point $T_{i+1j}$ being placed with respect to the reference point $T_{ij}$ in a direction that is orthogonal to the reference path $T_i$ at the reference point $T_{ij}$, comprised in the plane of the layer of powder and directed from the reference path $T_i$ toward the adjacent path $T_{i+1}$, carrying out in a loop the following secondary steps:

estimating a possible transverse width $L_{i+1j}$ of the simulated adjacent melt zone, estimating a possible overlap between the reference simulated melt zone and the adjacent simulated melt zone, resuming the loop of secondary steps while modifying the possible position of the adjacent point $T_{1+1j}$ if the estimated possible overlap corresponds to a fraction of the simulated reference melt zone less than the predetermined minimum fraction or greater than the predetermined maximum fraction.

Step b) of the preceding determining method may be specified first of all in that this determination is carried out successively for each adjacent point $T_{i+1j}$. Once an adjacent point has been determined, the following adjacent point is determined, in particular the following adjacent point in a direction of travel of the laser-scan trajectory by the laser.

This determination comprises estimating a transverse width $L_{ij}$ of the reference simulated melt zone. This transverse width is the total transverse width of the reference melt zone in the direction orthogonal to the reference path. This transverse width $L_{ij}$ depends on the portion of the laser-scan trajectory located upstream of the reference point $T_{ij}$: it depends on the temperature before consolidation, which depends on the energy delivered to the layer of powder by the laser along the trajectory upstream of the reference point and up to the reference point itself. It is not necessary to determine the position of the adjacent point $T_{i+1j}$ to estimate the transverse width $L_{ij}$.

The position of the adjacent point $T_{i+1j}$ is determined iteratively. An initial possible position of the adjacent point $T_{i+1j}$ is computed on the basis of the transverse width of the reference simulated melt zone $L_{ij}$ and of a predetermined target degree of overlap $\alpha c$.

The predetermined target degree of overlap is an ideal degree of overlap that it is desirable to achieve. As already mentioned above, it may be equal to 15% and make it possible to ensure the continuity of the melting of the layer of powder of a path adjacent to the next adjacent path.

The product of the transverse width Lij multiplied by the target degree of overlap $\alpha c$ gives the distance between the reference point $T_{ij}$ and the initial possible position of the adjacent point $T_{i+1j}$. The adjacent point $T_{i+1j}$ is placed in a direction that is orthogonal to the reference path $T_i$ at the reference point $T_{ij}$, comprised in the plane of the layer of powder and directed from the reference path $T_i$ toward the adjacent path $T_{i+1}$.

The possible position of the adjacent point $T_{i+1j}$ is then iteratively refined in a loop of secondary steps. More precisely it is the distance between the reference point $T_{ij}$ and the possible adjacent point $T_{i+1j}$ that is adjusted, the possible position of the adjacent point with respect to the reference point $T_{ij}$ always being placed in a direction that is orthogonal to the reference path $T_i$, comprised in the plane of the layer of powder and directed from the reference path $T_i$ to the adjacent path $T_{i+1}$.

The first secondary step consists in estimating a possible transverse width of the simulated adjacent melt zone $L_{i+1j}$. As the adjacent points are determined successively in the direction of the trajectory, the portion of the trajectory located upstream of the adjacent point in the process of being determined will have already been set. This allows the temperature before consolidation to be determined, which temperature depends on the energy delivered to the layer of powder by a laser scanning the trajectory upstream of the adjacent point in the process of being determined and on the energy delivered to the layer of powder by a laser scanning a possible continuation of the trajectory that passes through the possible position of the adjacent point. Since this delivered energy is known, it is possible to estimate a possible transverse width of the adjacent melt zone. This transverse width may in particular be a possible total transverse width of the adjacent melt zone in the direction orthogonal to the adjacent path.

Since the transverse width $L_{ij}$ of the reference simulated zone, a possible transverse width of the adjacent simulated melt zone, the position of the reference point and the possible position of the adjacent point are known, it is possible to estimate a possible overlap between the reference simulated melt zone and the simulated adjacent melt zone.

Depending on the obtained value of the estimated possible overlap, the secondary steps are reiterated or not.

If the estimated possible overlap corresponds to a fraction of the simulated reference melt zone comprised between the predetermined minimum fraction and the predetermined maximum fraction, then the possible position of the adjacent point is an acceptable position of the adjacent point, which is validated. The method continues with the determination of the following adjacent point in the direction of the scan of the trajectory.

Otherwise, the secondary steps are reiterated using a new possible position of the adjacent point. This new position may in particular take into account the obtained value of the estimated possible overlap: if the overlap is too large, the new possible position of the adjacent point is further from the reference point, if the overlap is too small, the new possible position of the adjacent point is closer to the reference point.

The following notations may be introduced: in the k-th iteration of the loop of secondary steps for determining the adjacent point $T_{i+1j}$, $T_{i+1j}(k)$ is the possible position of the adjacent point, $d_{ij}(k)$ the distance separating the reference point $T_{ij}$ and the possible position $T_{i+1j}(k)$ of the adjacent point, $L_{i+1j}(k)$ the possible transverse width of the simulated adjacent melt zone, $L_{ij}\alpha_{ij}(k)$ the estimated possible overlap between the reference simulated melt zone and the simulated adjacent melt zone, and $\alpha_{ij}(k)$ the associated degree of overlap.

Figures 1, 2:
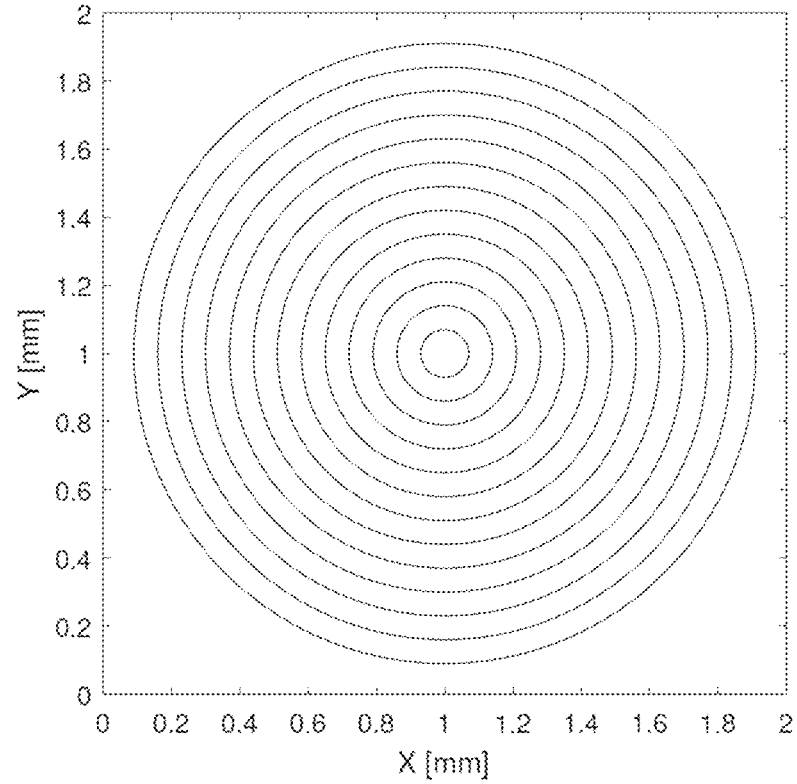
Figure 5:
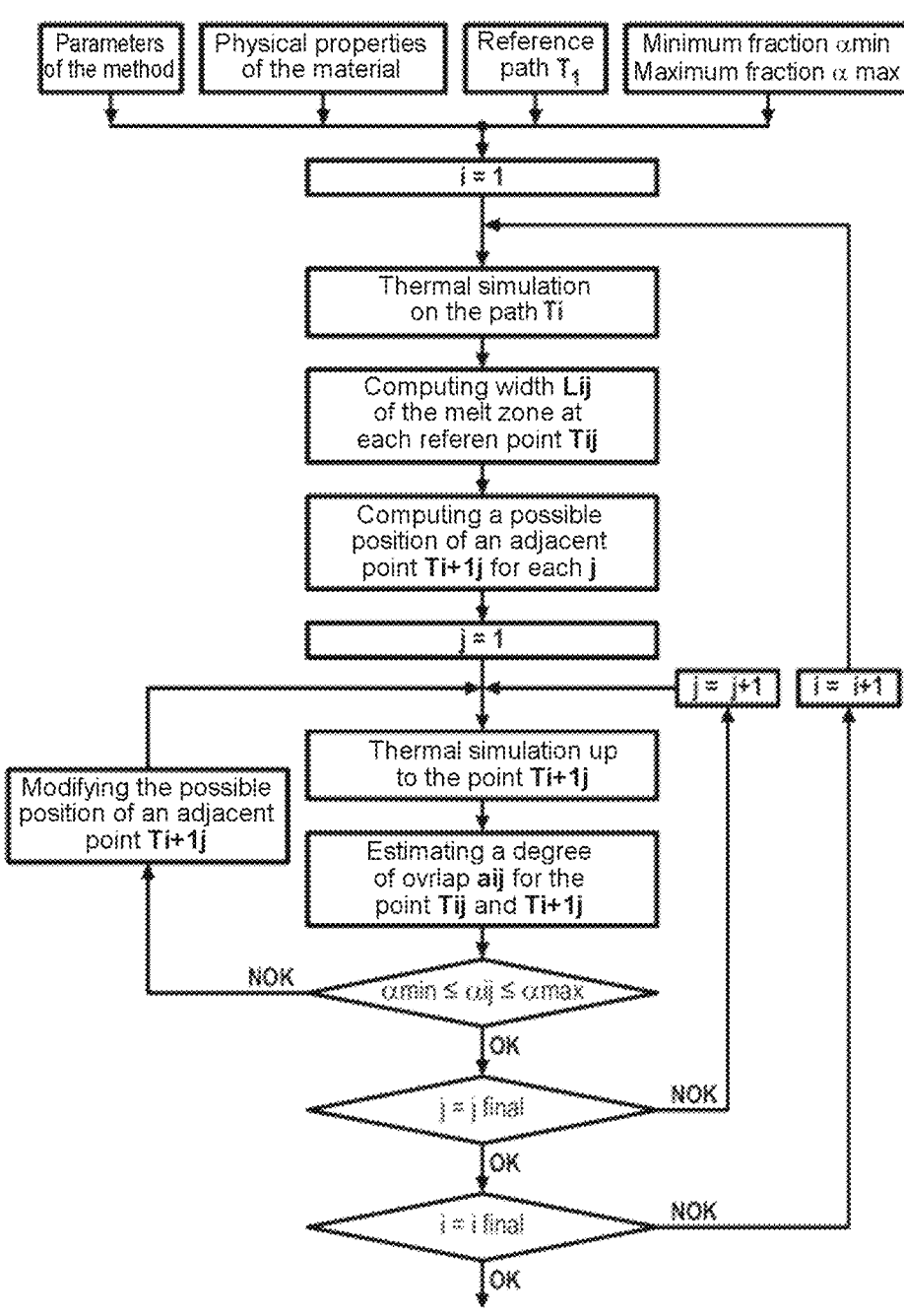
FIG. 5 is a schematic representation of a method for determining a laser-scan trajectory according to the invention.

FIG. 5 illustrates a method such as just presented.

Initially, it is necessary to provide the parameters of the process (power of the laser, radius of the laser beam or laser-beam cross section located at the intersection between the laser beam and the layer of powder, speed of movement of the laser beam along the laser-scan trajectory), the physical parameters of the material (thermal conductivity, heat capacity, density, melting point), a first reference path, a minimum fraction $\alpha min$ and a maximum fraction $\alpha max$.

A thermal simulation is then carried out on the path $T_1$, i.e. on the one hand a certain number of reference points $T_{ij}$ are chosen, and on the other hand a reference simulated melt zone is estimated for each of these points.

In particular, the widths $L_{1j}$ of the various melt zones are estimated.

An initial possible position $T_{2j}(1)$ of the adjacent points on the path $T_2$ that it is being sought to determine is then determined.

For the first adjacent point, corresponding to j=1, i.e. the first point of the path $T_2$ to be scanned by the laser in the direction of the trajectory, a possible transverse width $L_{21}(1)$ of the adjacent simulated melt zone is estimated, this being the object of the thermal simulation around the point $T_{21}(1)$.

It is possible to extract therefrom the estimate $\alpha_{21}(1)$ of a degree of overlap, which is compared to the minimum fraction $\alpha$min and to the maximum fraction $\alpha$max. If the estimate $\alpha_{21}(1)$ has a value between these limits, then the current possible position of the adjacent point $T_{21}(1)$ is validated. Otherwise, said possible position is changed to a new position $T_{21}(2)$ and the thermal simulation step for the adjacent point $T_{21}$ and the step of estimating the degree of overlap are performed again.

When the position of the adjacent point $T_{21}$ has been validated, the value of j is increased, i.e. the next adjacent point in the direction of scan of the laser of the adjacent path is passed to. The steps are the same, the reference point used this time being the point $T_{12}$ and the step of thermal simulation around the point $T_{22}$ taking into account the position of the adjacent point $T_{21}$ that was set beforehand.

And so forth, the adjacent points being determined in the direction of the scan of the adjacent path $T_2$.

The number of adjacent points to be determined is given by the number of reference points initially chosen—it corresponds to the value "j final" in FIG. 5. When all of the adjacent points have been determined, the adjacent path $T_2$ has in turn been determined.

The method continues starting with the determination of a new adjacent path, the reference path of which is the adjacent path that has just been determined. The method may be interrupted when a number "i final" of paths has been determined.

To determine whether the estimated overlap $L_{ij}\alpha_{ij}(k)$ corresponds to a fraction of the simulated reference melt zone comprised between the predetermined minimum fraction $\alpha$min and the predetermined maximum fraction $\alpha$max, it is possible to compute a dissimilarity between the estimated possible overlap and a target overlap equal to the product of the transverse width of the reference simulated melt zone $L_{ij}$ and of the target degree of overlap $\alpha$c already presented above.

When the dissimilarity is greater in absolute value than the product of the transverse width of the reference simulated melt zone and of a predetermined threshold degree of overlap $\alpha$s, the estimated possible overlap may correspond to a fraction of the simulated reference melt zone less than the predetermined minimum fraction $\alpha$min or greater than the predetermined maximum fraction $\alpha$max.

This situation is possible when, on the one hand, the maximum fraction $\alpha$max is equal to the sum of the target degree of overlap $\alpha$c and of the threshold degree of overlap $\alpha$s, and, on the other hand, the minimum fraction $\alpha$min is equal to the difference between the target degree of overlap $\alpha$c and the threshold degree of overlap $\alpha$s.

This is especially the case in particular when the maximum fraction is equal to $\alpha$max=18%, and the minimum fraction is equal to $\alpha$min=12%: it is then possible to choose a target degree of overlap equal to $\alpha$c=15% and a threshold degree of overlap equal to $\alpha$s=3%.

Application to the Case of a Trajectory Formed From Concentric Circles

The determining method has been implemented in the case of a trajectory formed from concentric circles, as presented in the section "Prior art".

A first circle was used as the first reference path $T_1$, and the method was used to determine following circle-shaped adjacent paths, each new adjacent path being exterior to the previously determined path.

The method was implemented with the following values: the maximum fraction was equal to $\alpha$max=18%, the minimum fraction was equal to $\alpha$min=12%, the target degree of overlap was equal to $\alpha$c=15% and the threshold degree of overlap was equal to $\alpha$s=3%.

The result of computation of the concentric trajectory, from interior to exterior, is shown in FIG. 6.

The determining method allowed an adaptive trajectory corresponding to a degree of overlap always comprised in the tolerance interval between the minimum fraction and the maximum fraction to be obtained. FIG. 7 shows the degree of overlap 70 as a function of the length of the trajectory formed from the various concentric circles. The length of the trajectory corresponds to a curvilinear position on the trajectory formed from the various circles, in the direction of scan of the trajectory. A trajectory length equal to zero corresponds to the very beginning of the first path $T_1$.

This situation corresponds to the ideal case where the optimum-quality indicator is equal to 1. Therefore, the adaptive trajectory resulted, at every point along the trajectory, in an iso-quality in terms of overlap between the melt zones surrounding the adjacent paths.

FIG. 8 describes the variation in the scan pitch of the trajectory shown in FIG. 6. The curve 80 shows the distance separating a circle from the following exterior circle as a function of the length of the trajectory formed from the various concentric circles. The jumps in the curve 80 reflect passage from one circle to the following exterior circle. The pitch at the start of the trajectory is equal to 85 µm then increases to 109 µm. Moving away from the centre, the scan pitch decreases overall to 95 µm, this corresponding to a decrease in the transverse width of the melt zone.

In this way the overlap between the melt zones is kept within the tolerance interval.

It will be noted that the increase in scan pitch for certain circles of the trajectory allows the total length of the trajectory to be decreased and therefore production time to be decreased.

Table 1 presents a summary of the trajectory length of the various cases envisaged for the type of trajectory formed from concentric circles.

| Trajectory type | Set pitch = 70 µm (Initial recipe) | Set pitch = 95 µm (Modified recipe) | Adaptive trajectory |
|---|---|---|---|
| Total trajectory length (mm) | 40.02 | 32.82 | 28.29 |

The adaptive trajectory makes it possible to obtain an increase of approximately 29% in the total length of the trajectory with respect to the initial recipe, and an increase of 14% with respect to the recipe with a fixed pitch of 95 µm.

FIG. 9 shows the field of the maximum temperature reached by the powder, when the layer of powder is scanned by a laser beam along the adaptive trajectory shown in FIG. 6.

The maximum recorded temperature is equal to 3150 K and the minimum value is equal to 1700 K.

The maximum in the maximum-temperature field is lower in comparison to the maximum of 3300 K obtained in the situation of the recipe with a fixed pitch equal to 70 µm, illustrated in FIG. 3.

Application to the Case of a Spiral-Shaped Trajectory

FIG. 10 schematically shows another type of laser-scan trajectory that may be chosen to manufacture a part having a disc shape. It is possible to scan a disc shape using a continuous spiral trajectory. FIG. 10 corresponds to a scan pitch equal to 70 μm. The laser scans the area from the interior to the exterior.

It is possible to establish the field of the maximum powder temperature reached in the area and to measure a maximum in this field equal to 3300 K and a minimum equal to 2350 K.

In the case of FIG. 10 and of a scan pitch of 70 μm, the measurement of the degree of overlap for the trajectory shown in FIG. 10 is given by the curve 110 in FIG. 11. It varies from 100% at the start of the trajectory (trajectory length equal to zero) i.e. at the centre of the spiral. The degree of overlap decreases to 40% at the exterior edges of the spiral. Therefore, the over-quality indicator is equal to 100%.

In order to decrease the degree of overlap, it is possible to use a larger set scan pitch equal to 95 μm. It is possible to establish, for this new pitch, the field of the maximum powder temperature reached in the area and to measure a maximum in this field equal to 3200 K and a minimum equal to 1950 K.

FIG. 12 schematically shows the measurement of the degree of overlap 120 for a spiral trajectory with a constant pitch equal to 95 μm. Setting the scan pitch equal to 95 μm made it possible to decrease the degree of overlap at the edges of the area, i.e. for long trajectory lengths. The optimum-quality indicator is equal to 63.96%. The degree of overlap at the start of the trajectory, i.e. at the centre of the spiral, is still greater than the maximum acceptable value. The over-quality indicator is equal to 36.04%.

Implementation of the trajectory-determining method may be applied to the case of a spiral-shaped trajectory. The reference path initially set at the start of the process corresponds to a spiral turn the size of which has been set so that the degree of overlap is comprised between the maximum fraction αmax=18% and the minimum fraction αmin=12%.

FIG. 13 shows the obtained adaptive trajectory and FIG. 14 shows the scan pitch as a function of the position on the adaptive trajectory.

The pitch at the start of the trajectory, i.e. at the centre of the spiral, is equal to 125 μm and the minimum value of the pitch is equal to 103 μm. In the maximum-temperature field associated with this adaptive trajectory, the maximum recorded is equal to 3100 K and the minimum is equal to 1800 K.

FIG. 15 shows the degree of overlap αs a function of the position on the adaptive trajectory 150. The whole of the curve 150 is comprised in the optimum-quality zone, corresponding to an optimum-quality ratio of 100%.

The adaptive trajectory also allows the length of the trajectory to be decreased. Table 2 lists the trajectory lengths in the two cases of set-pitch recipes and in the case of the adaptive trajectory.

| Trajectory type | Set pitch = 70 μm (Initial recipe) | Set pitch = 95 μm (Modified recipe) | Adaptive trajectory |
|---|---|---|---|
| Trajectory length (mm) | 44 | 30.47 | 27.33 |

The adaptive trajectory allows a decrease of about 38% with respect to the trajectory computed with the initial recipe.

Application to the Case of a Part of Four-Pointed Star Shape

FIG. 16 schematically shows a laser-scan trajectory that may be chosen to manufacture a part having a four-pointed star shape. FIG. 16 corresponds to a scan pitch equal to 70 μm.

The trajectory is scanned by the laser from the centre of the spiral in zone A. Next, the laser scans the arms in the following order of the zones: B, C, D and E. The portion of the trajectory within each of the zones B, C, D and E is made up of circularly arcuate adjacent paths scanned from the interior of the part to the exterior of the part.

It is possible to establish, for this trajectory, the field of the maximum powder temperature reached in the area and to measure a maximum in this field equal to 3500 K and a minimum equal to 2500 K.

The maximum temperature reached is greater in the centre of zone A than outside of zone A. Within the arms of the star, i.e. within zones B, C, D and E, the maximum temperature reached is greater than at the centre of zone A. As the length of the circularly arcuate adjacent paths gradually decreases in an arm, the maximum temperature reached increases and zones of overheating appear at the exterior end of each arm.

As the degree of overlap increases the maximum temperature increases. FIG. 17 schematically shows the variation in the degree of overlap along the trajectory.

The degree of overlap is 100% at the centre of the star, i.e. at the start of the trajectory (trajectory length equal to zero in FIG. 17), then it decreases to 40%. There are then in the curve four patterns of variation. Each pattern of variation comprises an increase toward 80% followed by a sharp drop in degree below 50%. Each pattern of variation corresponds to the scan of one arm. During the scan of an arm, the degree of overlap increases until it reaches the highest values toward the end of the scan. The very beginning of the scan of the following arm corresponds to a sharp drop in the degree of overlap.

The over-quality indicator Isq is equal to 100%.

Increasing the scan pitch to 95 μm allows both the maximum temperatures reached and the degrees of overlap to be decreased.

The field of the maximum powder temperature reached shows, for a star-shaped trajectory with a pitch equal to 95 μm, a maximum equal to 3200 K and a minimum equal to 2000 K.

The optimum-quality indicator $I_{op}$ is equal to 12.25%. However, the degree of overlap remains greater than the maximum fraction over most of the trajectory, the over-quality indicator $I_{sq}$ is 87.75%.

Implementation of the trajectory-determining method may be applied to the case of a four-pointed-star shaped trajectory. The reference path initially set at the start of the process corresponds to a spiral turn, the size of which has been set so that the degree of overlap is comprised between the maximum fraction αmax=18% and the minimum fraction αmin=12%.

FIG. 18 shows the obtained adaptive trajectory and FIG. 19 shows the scan pitch as a function of the position on the adaptive trajectory.

The value of the pitch is maximum at 125 μm at the very beginning of the trajectory, i.e. at the centre of the spiral A shown in FIG. 18.

The pitch then decreases as the laser scans this zone A.

Next, there are four patterns of variation in the curve of the pitch. Each pattern of variation comprises an increase to 120 μm followed by a decrease below 115 μm. Each pattern of variation corresponds to the scan of one arm.

The minimum pitch value is recorded as 100 μm (curve length between 11 and 12 mm). This value corresponds to the first adjacent path of the last arm E. As a result of the time taken to scan the three previous arms B, C and D, the energy delivered by the laser has dissipated. Thus, the temperature before consolidation of the powder along the first path of arm E is appreciably lower than for the first path of arm B. To ensure the melt zone in the portion of zone A near arm E and the zone surrounding the first path of arm E join up, it is necessary to decrease the scan pitch.

In the associated maximum-temperature field, the noted maximum is equal to 3150 K and the minimum is equal to 1800 K. The degree of overlap αs a function of position on the adaptive trajectory is always comprised in the optimum-quality zone, corresponding to an optimum-quality ratio of 100%.

The adaptive trajectory again allows the length of the trajectory to be decreased. Table 3 lists the trajectory lengths in the two cases of set-pitch recipes and in the case of the adaptive trajectory.

| Trajectory type | Set pitch = 70 μm (Initial recipe) | Set pitch = 95 μm (Modified recipe) | Adaptive trajectory |
|---|---|---|---|
| Trajectory length (mm) | 21.33 | 16.1 | 13.57 |

The adaptive trajectory allows a decrease of about 36% with respect to the trajectory computed with the initial recipe.

Example of Estimation of the Overlap

To estimate a possible overlap between the reference simulated melt zone and the simulated adjacent melt zone, the half-sum of a transverse width of the reference simulated melt zone and of a possible transverse width of the simulated adjacent melt zone subtracted from the distance separating the possible position of the adjacent point $(T_{i+1j})$ and the position of the reference point $(T_{ij})$ is determined.

FIGS. 20 and 21 illustrate this estimation by virtue of schematic representations of simulated melt zones in two different configurations of overlap between the reference simulated melt zone 38, 48 that surrounds the reference point of position vector numbered 31, 41 and the adjacent simulated melt zone 39, 49 that surrounds the possible position of the adjacent point of position vector numbered 32,42.

Melt zone 38 of FIG. 20 surrounds a reference point $T_{ij}$ of position vector numbered 31. The total transverse width 36 of the melt zone 38 corresponds to the term $L_{ij}$.

Furthermore, in the direction of the vector numbered 34 in FIG. 20, is found the melt zone 39 that surrounds the possible position of the adjacent point of position vector numbered 32. The possible total width 37 of the melt zone 39 corresponds to the possible width $L_{i+1j}$. The distance separating the possible position of the adjacent point $(T_{i+1j})$ and the position of the reference point $(T_{ij})$ is referenced 33 in FIG. 20 and may be expressed as $d_{ij}$.

FIG. 20 corresponds to the situation in which the areas 38 and 39 intersect and have a common area. In this situation, it is possible to estimate an overlap, denoted 35 in FIG. 20, the value of which is estimated as $$\frac{L_{ij}}{2} + \frac{L_{i+1j}}{2} - d_{ij}$$

Melt zone 48 of FIG. 21 surrounds a reference point $T_{ij}$ of position vector numbered 41. The total width 46 of the melt zone 48 corresponds to the term $L_{ij}$.

Further along, in the direction of the vector numbered 44 in FIG. 21, is found the melt zone 49 that surrounds the possible position of the adjacent point of position vector numbered 42. The possible width 47 of the melt zone 49 corresponds to the possible width $L_{i+1j}$. The distance separating the possible position of the adjacent point $(T_{i+1j})$ and the position of the reference point $(T_{ij})$ is referenced 43 in FIG. 21 and may be expressed as $d_{ij}$.

FIG. 21 corresponds to the situation where the surfaces 38 and 39 do not intersect and do not have a common area. In this situation, it is not possible to estimate an overlap, but it is possible to define a spacing, denoted 45 in FIG. 21, $$d_{ij} - \left(\frac{L_{ij}}{2} + \frac{L_{i+1j}}{2}\right)$$

During the trajectory-determining method such as presented above, when resuming the loop of secondary steps, the possible position of the adjacent point $(T_{i+1j})$ is modified so that the distance separating the possible position of the adjacent point $(T_{i+1j})$ and the position of the reference point $(T_{ij})$ is replaced by the difference between said distance and the dissimilarity between the estimated possible overlap and the product of the transverse width of the reference simulated melt zone and of the target degree of overlap In this case, the new possible position $T_{i+1j}(k+1)$ of the adjacent point before reiteration of the secondary steps takes into account the obtained value of the estimated overlap: if the overlap is too large, the new possible position of the adjacent point is further from the reference point, if the overlap is too small, the new possible position of the adjacent point is closer to the reference point.

More precisely, the dissimilarity $(L_{ij}\alpha_{ij}(k)-L_{ij}\alpha c)$ between the estimated overlap and the product of the transverse width of the reference simulated melt zone and of the target degree of overlap is used.

The distance $d_{i+1j}(k)$ separating the possible position $T_{i+1j}(k)$ of the adjacent point and the position of the reference point $T_{ij}$ is replaced by a new distance $d_{i+1j}(k+1)$ separating the new possible position $T_{i+1j}(k+1)$ of the adjacent point and the position of the reference point $T_{ij}$. The relationship between these distances is given by:

$$d_{i+1j}(k+1)=d_{i+1j}(k)-(L_{ij}\alpha_{ij}(k)-L_{ij}\alpha c).$$

This allows a new possible position $T_{i+1j}(k+1)$ of the adjacent point to be provided.

Estimation of a Transverse Width of a Simulated Melt Zone Surrounding a Point of the Trajectory Scanned by the Laser Certain of the previously described methods for determining the trajectory followed by a selective-additive-manufacturing laser beam may require estimation of a transverse width of a simulated melt zone that surrounds a particular point of a particular path, for example a reference point of the reference path or a point located at a possible position of an adjacent point. This particular point may be called a study point and a transverse width of a simulated melt zone that surrounds a study point may be estimated by implementing the steps described below.

In a first step, a plurality of computation points are determined among the points of the layer of powder that are located in a neighbourhood of the study point. The extent of the neighbourhood of the study point and the number of computation points within this neighbourhood determine, on the one hand, the quality of the obtained estimate, and, on the other hand, the computation time required to obtain the estimate.

The quality of the estimate and the computation time each increase as the extent of the neighbourhood increases or as the number of computation points increases.

In a second step, a maximum temperature reached by the powder is estimated at each of the computation points. This estimation may take into account variations in temperature of the layer of powder at the study points due to emission of a laser beam so as to consolidate zones of the layer of powder surrounding points upstream of the portion of the trajectory located upstream of a passage of the laser beam to the study point. The study point being either a reference point or the adjacent point in the process of being determined, the portion of the trajectory located upstream from the study point is known from the start of the method or has already been determined by the method. The estimation may also take into account the variation in temperature of the layer of powder at the study points that is due to emission of a laser beam so as to consolidate a zone of the layer of powder surrounding the study point. In the same way, the estimation may take into account the variation in temperature of the layer of powder at the study points that is due to the consolidation of a previous layer of powder, or that is due to preheating of the layer of powder with heating means.

In a third step, the maximum temperature thus estimated is compared with the melting point of the powder.

computation point due to emission of a laser beam to be estimated so as to consolidate a zone of the layer of powder surrounding the study point.

The variation in temperature of the powder at the computation point due to emission of a laser beam so as to consolidate a zone of the layer of powder surrounding an upstream point or the study point is a series of dated values. The variation in temperature is estimated at various times that are located in an estimation time interval that comprises the time of passage of the laser beam to the study point. The estimation time interval is the total duration of the estimated recipe, from any preheating of the powder, or the first consolidation of a zone of the layer of powder, to the last consolidation of a zone of the layer of powder.

Assuming that the laser beam is emitted at the time u in order to consolidate a zone of the layer of powder surrounding either an upstream point or the study point, the energy received by the layer during the emission of the laser beam so as to consolidate said zone of the layer of powder is denoted Q.

The estimation of the variation in temperature $\Delta T$ of the powder at the computation point at a time t subsequent to the time u may be written in the following way:

$$\Delta T(r, t - u) = \frac{2Q}{\varepsilon\sqrt{\pi^3(t_0 + (t - u))}} \frac{1}{R^2 + 8a(t - u)} \exp\left(\frac{-2r^2}{R^2 + 8a(t_0 + (t - u))}\right)$$

In a fourth step, the computation points, the estimated maximum temperature of which is greater than or equal to the melting point of the powder, are identified. They may be designated by the expression "melted points".

All of these melted points are located grouped around the study point. All the computation points the estimated maximum temperature of which is strictly lower than the melting point of the powder are located at a greater distance from the study point, outside of a zone occupied by the melted points.

Knowing the distribution of the melted points, it is possible to estimate the transverse width of the zone inside of which the melted points are located. This zone corresponds to the simulated melt zone. The precision of the estimation of the zone increases as the size of the chosen neighbourhood increases and as the number of computation points increases.

Lastly, in a fifth step, a transverse width of the melt zone surrounding the study point is estimated in the direction pointing from the reference path to the adjacent path.

Estimation of the Maximum Temperature Reached at a Computation Point

Certain of the previously described methods for determining the trajectory followed by a selective-additive-manufacturing laser beam may require a maximum temperature reached by the powder at a computation point of the layer of powder during the process of scanning the powder with a laser beam to be estimated.

This estimation may be carried out taking into account the diffusion, at the computation point, of the energy delivered by the laser to the layer of powder so as to consolidate zones of the layer of powder that are located upstream on the laser-scan trajectory, based on implementation of the steps described below. In a first step, a computation is carried out, for each upstream point, to estimate a variation in temperature of the powder at the computation point due to emission of a laser beam so as to consolidate a zone of the layer of powder surrounding the upstream point. The computation also allows a variation in temperature of the powder at the in which $\varepsilon$ is a thermal effusivity of the layer of powder, R is a radius of the laser beam, $\alpha$ is a thermal diffusivity of the layer of powder, $t_0$ is a predetermined time and r is the distance between the computation point and the point, which is either an upstream point or the study point and which belongs to the zone of the layer of powder consolidated at the time u.

In a second step, an estimate of a temperature of the powder at the computation point is computed. Again this estimate is a series of dated values. The temperature of the powder at the computation point is estimated at various times that are located in the estimation time interval.

This computation takes take into account the emission of a laser beam so as to scan the portion of the trajectory located upstream of the study point and so as to consolidate a zone of the layer of powder surrounding the study point. The estimation of the temperature T of the powder at the computation point at a time t may be written in the following way:

$$Tp(t) = T_0 + \sum_{u<t}\Delta T(r, t - u)$$

in which $T_0$ is the initial temperature of the powder, $$\sum_{u<t}$$

corresponds to the sum over all of said upstream or study points that at the time t are surrounded by a zone of the layer of powder consolidated by the laser. It will be noted that the term "r" in the preceding expression varies as a function of the time "u".

In a third step, a maximum value retained as the maximum temperature reached at the computation point is extracted from the series of dated values forming the estimate of the temperature of the powder at the computation point.

Temporal Neighbourhood and Spatial Neighbourhood

The time taken to determine the maximum temperatures of the computation points increases as the precision of the estimation increases, i.e. as the number of upstream points increases.

In order to limit the computation time without impairing the quality of the estimate, it is possible to define a spatial neighbourhood Vl and a temporal neighbourhood Vt, which limits the number of upstream points to be taken into account in the computations.

The temporal neighbourhood Vt represents the duration of the thermal effects of the scan of a trajectory segment. Beyond this duration, the effect on the temperature of the powder of the energy diffused into the environment of the scanned segment and delivered during its scan may be considered to be negligible.

The spatial neighbourhood Vl represents the maximum distance of the thermal effects of the scan of a trajectory segment. Beyond this distance, the effect on the temperature of the powder of the energy diffused into the environment of the scanned segment and supplied during its scan may be considered to be negligible.

The negligible character requires a temperature threshold difference $D_S$ to be defined. The thermal effects of the scan corresponding to variations in temperature below this difference are considered to be negligible.

The temporal neighbourhood Vt and the spatial neighbourhood Vl may be determined using the following method, which is illustrated in FIG. 22:

In a first step, the following information is stored in a memory of a computer:

the parameters of the laser-scanning process (laser power and beam, laser-scan speed), the parameters of the material (thermal conductivity, thermal capacity, density, melting point and initial temperature of the powder $T_0$), the coordinates of a trajectory of straight-line segment type.

In a second step, the computer delivers an estimate of the temperature of the powder in a predefined spatial domain that comprises the trajectory defined in the previous step.

The temperature estimate delivered by the computer corresponds to the temperature of the powder at a predefined time located temporally after a powder thermalization time at the end of the scan of the entire trajectory by the laser.

This estimate may be computed based on the elements that were defined above, such as the sum of variations in temperature of the layer of powder due to the emission of a laser beam so as to consolidate a zone of the layer of powder surrounding a point of the trajectory.

At the end of the second step, a map of the temperatures of the powder in the predefined spatial domain at the predefined time is obtained.

In a third step, an isothermal curve corresponding to the sum $T_0+D_S$ of the initial temperature $T_0$ of the powder and of the temperature threshold difference $D_S$ is determined within the temperature map obtained in the second step. This isothermal curve corresponds to an increase in temperature of the temperature threshold difference $D_S$.

In a fourth step, the spatial neighbourhood is determined as the maximum distance in the direction perpendicular to the trajectory of the straight-line segment type between two points of the isothermal curve determined in the previous step.

In a fifth step, the temporal neighbourhood is determined as the ratio to the scan speed of the laser of the maximum distance in the direction of the trajectory of the straight-line segment type between two points of the isothermal curve determined in the third step.

FIG. 23 shows the distances used to determine the spatial neighbourhood and the temporal neighbourhood.

The X axis shown in FIG. 23 represents the direction of the straight-line segment of the trajectory defined in the first step of the above method. The trajectory is scanned in the direction of the increasing values of X. The Y axis represents the direction perpendicular to the trajectory of the straight-line segment type.

The closed curve 100 represents the isothermal curve defined in the third step of the above method.

The spatial neighbourhood corresponds to the length of the segment 101.

The maximum distance between two points of the isothermal curve determined in the third step in the direction of the trajectory of the straight-line segment type corresponds to the length of the segment 102. The ratio of the length of the segment 102 to the scan speed makes it possible to define the temporal neighbourhood.

Once the spatial neighbourhood V1 and the temporal neighbourhood Vt have been determined, these data may be used to limit the computation time taken to predetermine the variations in temperature allowing the maximum temperatures reached by the powder during the selective-additive-manufacturing process to be computed.

More precisely, the computation, for each upstream point, of an estimate of a variation in temperature of the powder at the computation point due to emission of a laser beam so as to consolidate a zone of the layer of powder surrounding the upstream point may comprise the following steps:

computing, for each upstream point, a distance separating the study point and said upstream point, comparing said distance to a predetermined spatial-neighbourhood distance, estimating as zero, for each upstream point separated from the study point by a distance greater than the spatial-neighbourhood distance, a variation in temperature of the powder at the computation point due to emission of a laser beam so as to consolidate a zone of the layer of powder surrounding the upstream point.

The computation, for each upstream point, of an estimate of a variation in temperature of the powder at the computation point due to emission of a laser beam so as to consolidate a zone of the layer of powder surrounding the upstream point, may also comprise the following steps:

computing, for each upstream point, a duration separating emission of a laser beam so as to consolidate a zone of the layer of powder surrounding the upstream point and the passage of the laser beam to the study point, comparing said duration to a predetermined temporal-neighbourhood duration, estimating as zero, for each upstream point the computed duration of which is greater than the temporal-neighbourhood duration, a variation in temperature of the powder at the computation point due to emission of a laser beam so as to consolidate a zone of the layer of powder surrounding the upstream point.

Selective-Additive-Manufacturing Process and Apparatus

A process for selective additive manufacture of a three-dimensional object from a layer of powder, in an additive-manufacturing apparatus, is provided, the process comprising the following steps:

applying a layer of additive-manufacturing powder to a
carrier or to a previously consolidated layer, emitting a laser beam onto the layer of powder following
a trajectory made up of a plurality of adjacent paths, the
passage of the laser beam over these paths causing the
layer of powder to melt, the trajectory being determined by implementing one of
the trajectory-determining methods such as presented
above, said trajectory being stored and/or transmitted to
a control unit of the selective-additive-manufacturing
apparatus.

The manufacturing process will possibly in particular be
implemented by virtue of an apparatus 121 for the selective
additive manufacture of a three-dimensional object 122 from
a layer of powder, the apparatus comprising: a powder
reservoir 127 located above a horizontal plate 123, an
arrangement 124 for distributing said metal powder to the
plate, and configured to successively spread a plurality of
layers of powder, a laser source 1212 and a control unit 129
configured to control the laser source so as to emit a laser
beam onto the layer of powder following a trajectory made
up of a plurality of adjacent paths.

FIG. 24 illustrates such a selective-additive-manufactur-
ing apparatus 121 and shows:

a carrier, such as a horizontal plate 123, on which the
various layers of additive manufacturing powder (metal
powder, ceramic powder, etc.) are successively depos-
ited, allowing a three-dimensional object to be manu-
factured (object 122 of fir-tree shape in FIG. 24), a powder reservoir 127 located above the plate 123, an arrangement 124 for distributing said metal powder
over the plate, this arrangement 124 comprising, for
example, a doctor blade 125 and/or a layer-forming
roller for spreading the various successive layers of
powder (movement along the double-headed arrow A), an assembly 128 comprising at least one laser source 1212
for (completely or partially) melting the spread thin
layers, the laser beam generated by the source 1212
making contact with the spread thin layers in the
powder plane, i.e. in the plane in which the layer of
powder has been spread by the doctor blade 125, a control unit 129 that controls the various components of
the apparatus 121. The control unit 129 is connected to
a memory M in which a predetermined trajectory may
be stored, a mechanism 1210 that allows the carrier of the plate 123
to be lowered as layers are deposited (movement along
the double-headed arrow B).

In the example described with reference to FIG. 24, at
least one galvanometric mirror 1214 allows the laser beam
output by the source 1212 to be oriented and moved with
respect to the object 122, depending on information sent by
the control unit 129. Any other deflection system may of
course be envisaged.

The components of the apparatus 121 are arranged inside
a sealed chamber 1217 that may be connected to an air or
inert-gas processing circuit. The air or inert-gas processing
circuit may furthermore be configured to adjust the pressure
within the sealed chamber 1217 to below or above atmo-
spheric pressure.

The selective-additive-manufacturing apparatus 121 may
also include a computer C, as shown in FIG. 24, for
determining estimates of variations in temperature once the
manufacturing process has started or more generally for
implementing one of the trajectory-determining methods
such as presented above.

The computer C is configured to process various points of
the path fast enough, in particular the time taken by the
computer to process the various points must be less than or
at least equal to the time taken by the laser beam to irradiate
or scan these same points at the scan speed.

Such a computer C may collaborate with the memory M
in order to store estimates of variations in temperature once
they have been produced.

Lastly, any step of the trajectory-determining method
described above may be implemented by a suitable instruc-
tion of a computer program. A computer program compris-
ing one or more such instructions of this type may be
executed on a computer.

The invention claimed is:

1. A method of determining a trajectory followed by a
laser beam for selective additive manufacture of a three-
dimensional object, the method comprising:

(I) an emitting step including emitting, via a laser source,
a laser beam toward a layer of powder for manufac-
turing the three-dimensional object;

(II) a determining step comprising:

(a) a first determining step including determining, on a
predetermined reference path, a plurality of reference
points, (b) a second determining step including determining a
plurality of adjacent points located on a same side of
the predetermined reference path, each adjacent point
being associated with a reference point and being such
that a simulated adjacent melt zone that surrounds the
adjacent point and a simulated reference melt zone that
surrounds the reference point have an overlap corre-
sponding to a fraction of a transverse width of the
simulated reference melt zone that is comprised
between a predetermined minimum fraction and a
predetermined maximum fraction, the second deter-
mining step comprising successively, for each adjacent
point in one direction of travel of a trajectory of the
laser beam, the following steps:

(1) estimating, for a reference point associated with an
adjacent point, a transverse width of a reference simu-
lated melt zone;

(2) determining an initial position of the adjacent point, a
distance separating the initial position of the adjacent
point from a position of the reference point being equal
to a product of the transverse width of the reference
simulated melt zone and of a predetermined target
degree of overlap, the adjacent point being placed with
respect to the reference point in a direction that is
orthogonal to the predetermined reference path at the
reference point, comprised in a plane of the layer of
powder and directed from the predetermined reference
path toward an adjacent path; and (3) carrying out secondary steps, which are as follows:

(i) estimating an initial transverse width of a simulated
adjacent melt zone;

(ii) estimating an overlap between the reference simulated
melt zone and the adjacent simulated melt zone; and (iii) repeating the secondary steps while modifying the
initial position of the adjacent point if the estimated
overlap corresponds to a fraction of the simulated
reference melt zone less than a predetermined mini-
mum fraction or greater than a predetermined maxi-
mum fraction;

(c) a third determining step including determining an
adjacent path linking the plurality of adjacent points;
and (d) repeating the first determining step, the second determining step, and the third determining step in a loop using the adjacent path determined as a new reference path, so as to determine, on each iteration, a new adjacent path among the plurality of adjacent paths, until all adjacent paths to be travelled by the laser beam in the layer of powder have been determined, the plurality of adjacent paths that have been determined defining a determined trajectory, which is followed by the laser beam;

(III) a storing or transmitting step including storing or transmitting the determined trajectory to the control unit of a selective additive manufacturing apparatus;

(IV) an estimating step including estimating the transverse width of a zone being a total width in a direction transverse to a direction of scanning of the laser beam; and (V) a moving step, occurring after the determining step (II), including moving the laser beam along the determined trajectory made up of the plurality of adjacent paths to cause the layer of powder to melt according to the determined trajectory to optimize overlapping of melt zones for melting the layer of powder such that non-melted portions of the layer of powder are avoided to prevent defects in the three-dimensional object, the determined trajectory being directed by a computer simulation that provides a desired path of the laser beam, wherein the moving step includes controlling the laser source, via a control unit, to emit the laser beam onto the layer of powder according to the determined trajectory.

2. The method according to claim 1, further comprising:

determining a numerical dissimilarity between the estimated overlap and a target overlap equal to a product of the transverse width of the reference simulated melt zone and of the predetermined target degree of overlap.

3. The method according to claim 2, wherein the predetermined target degree of overlap is equal to 15%, the predetermined minimum fraction is equal to 12%, and the predetermined maximum fraction is equal to 18%.

4. The method according to claim 2, wherein, to estimate the overlap between the reference simulated melt zone and the simulated adjacent melt zone, a half-sum of a transverse width of the reference simulated melt zone and of an initial transverse width of the simulated adjacent melt zone subtracted from a distance separating the initial position of the adjacent point and the position of the reference point is determined.

5. The method according to claim 2, wherein, when repeating the secondary steps, the initial position of the adjacent point is modified so that the distance separating the initial position of the adjacent point and the position of the reference point is replaced by a difference between the distance and the dissimilarity between the estimated overlap and a product of the transverse width of the reference simulated melt zone and of the predetermined target degree of overlap.

6. The method according to claim 1, wherein the step of estimating a transverse width of the simulated melt zone that surrounds a study point located on the layer of powder, the study point being a reference point of the reference path or a point at an initial position of an adjacent point, comprises the following steps:

determining a plurality of computation points, the computation points being points of the layer of powder that are located in a neighborhood of the study point;

estimating a maximum temperature reached at each of the computation points, the estimate being made on the basis of variations in temperature due to the emitting step so as to consolidate zones of the layer of powder surrounding upstream points located on a plurality of paths upstream of a passage of the laser beam to the study point, and the estimate being made on the basis of a variation in temperature of the powder at the computation point due to the emitting step so as to consolidate a zone of the layer of powder surrounding the study point;

comparing the maximum temperature reached estimated with a melting point of the powder;

identifying, among the computation points, melted points for which the estimate of the maximum temperature reached is greater than or equal to the melting point of the powder; and estimating a transverse width of a zone occupied by the melted points.

7. The method according to claim 6, wherein the step of estimating the maximum temperature at the computation point comprises the following steps:

computing, for each upstream point located on the plurality of paths upstream of a passage of the laser beam to the study point, an estimate of a variation in temperature of the powder at the computation point due to emission of a laser beam so as to consolidate a zone of the layer of powder surrounding the upstream point;

computing an estimate of a variation in temperature of the powder at the computation point due to emission of a laser beam so as to consolidate a zone of the layer of powder surrounding the study point;

computing the estimate of a temperature of the powder at the computation point depending on the estimates of the variations in temperature due to emission of a laser beam so as to consolidate zones of the layer of powder surrounding the study point or upstream points; and computing the estimate of a maximum temperature at the computation point by extracting a maximum value retained as the maximum temperature reached at the computation point from a series of dated values forming the estimate of the temperature of the powder at the computation point.

8. The method according to claim 6, wherein the step of estimating, for each upstream point, an estimate of a variation in temperature of the powder at the computation point due to emission of a laser beam so as to consolidate a zone of the layer of powder surrounding the upstream point comprises the following steps:

computing, for each upstream point, a distance separating the study point and the upstream point;

comparing the distance to a predetermined spatial-neighborhood distance; and estimating as zero, for each upstream point separated from the study point by a distance greater than the spatial-neighborhood distance, a variation in temperature of the powder at the computation point due to the emitting step so as to consolidate a zone of the layer of powder surrounding the upstream point.

9. The method according to claim 6, wherein the step of estimating, for each upstream point, an estimate of a variation in temperature of the powder at the computation point due to the emitting step so as to consolidate a zone of the layer of powder surrounding the upstream point comprises the following steps:

computing, for each upstream point, a duration separating emission of a laser beam so as to consolidate a zone of the layer of powder surrounding the upstream point and the passage of the laser beam to the study point;

comparing the duration to a predetermined temporal-neighborhood duration; and estimating as zero, for each upstream point the computed duration of which is greater than the temporal-neighborhood duration, a variation in temperature of the powder at the computation point due to the emitting step so as to consolidate a zone of the layer of powder surrounding the upstream point.

10. A process for selective additive manufacture of a three-dimensional object from a layer of powder, the process comprising, in a selective additive manufacturing apparatus:

determining a trajectory by implementing the method according to claim 1;

applying a layer of additive manufacturing powder to a carrier or to a previously consolidated layer; and emitting a laser beam onto the layer of powder following the trajectory.

11. A computer program stored in a computer readable medium comprising instructions suitable for implementing the steps of the method according to claim 1 when the computer program is executed on a computer.

\* \* \* \* \*